United States Patent
Kadiri et al.

(10) Patent No.: US 11,533,653 B2
(45) Date of Patent: Dec. 20, 2022

(54) MAPPING MULTICAST BROADCAST QUALITY OF SERVICE FLOWS TO LOGICAL CHANNEL IDENTIFIERS

(71) Applicant: QUALCOMM Incorporated, San Diego, CA (US)

(72) Inventors: Prasad Reddy Kadiri, San Diego, CA (US); Alberto Rico Alvarino, San Diego, CA (US); Xipeng Zhu, San Diego, CA (US); Umesh Phuyal, San Diego, CA (US); Gavin Bernard Horn, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 16 days.

(21) Appl. No.: 16/998,608

(22) Filed: Aug. 20, 2020

(65) Prior Publication Data
US 2021/0068004 A1  Mar. 4, 2021

Related U.S. Application Data

(60) Provisional application No. 62/894,582, filed on Aug. 30, 2019.

(51) Int. Cl.
*H04W 28/02* (2009.01)
*H04W 4/06* (2009.01)
*H04L 12/18* (2006.01)

(52) U.S. Cl.
CPC ......... *H04W 28/0268* (2013.01); *H04W 4/06* (2013.01); *H04L 12/189* (2013.01)

(58) Field of Classification Search
CPC ......... H04W 28/0268; H04W 28/0263; H04W 4/06; H04L 47/15; H04L 47/806; H04L 12/189
See application file for complete search history.

(56) References Cited

U.S. PATENT DOCUMENTS

| | | | | |
|---|---|---|---|---|
| 10,440,607 | B2* | 10/2019 | Fujishiro | H04W 76/11 |
| 2018/0279262 | A1 | 9/2018 | Babaei et al. | |
| 2019/0174460 | A1* | 6/2019 | Zhang | H04L 27/2666 |
| 2019/0181975 | A1* | 6/2019 | Kalhan | H03M 13/25 |
| 2020/0008097 | A1* | 1/2020 | Fujishiro | H04W 72/042 |

FOREIGN PATENT DOCUMENTS

EP  3282725 A1  2/2018

OTHER PUBLICATIONS

International Search Report and Written Opinion—PCT/US2020/047353—ISA/EPO—dated Oct. 30, 2020.

* cited by examiner

*Primary Examiner* — Habte Mered
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a mode for mapping multicast broadcast quality of service (MB-QoS) flows to logical channel identifiers and group radio network temporary identifiers (G-RNTIs); identify an MB-QoS flow from a medium access control (MAC) transport block (TB) based at least in part on the indicated mode; and decode data included in the MB-QoS flow. Numerous other aspects are provided.

30 Claims, 13 Drawing Sheets

FIGURE 10

MAPPING MULTICAST BROADCAST QUALITY OF SERVICE FLOWS TO LOGICAL CHANNEL IDENTIFIERS

CROSS-REFERENCE TO RELATED APPLICATION

This Patent Application claims priority to U.S. Provisional Patent Application No. 62/894,582, filed on Aug. 30, 2019, entitled "MAPPING MULTICAST BROADCAST QUALITY OF SERVICE FLOWS TO LOGICAL CHANNEL IDENTIFIERS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for mapping multicast broadcast quality of service flows to logical channel identifiers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In LTE single cell point-to-multipoint (SC-PTM), a single logical channel identifier is used for both a single cell multicast broadcast control channel (SC-MCCH) that carries multicast broadcast control information and a single cell multicast broadcast traffic channel (SC-MTCH) that carries multicast broadcast traffic. As a result, LTE SC-PTM does not support retransmissions because different SC-MTCHs are not uniquely identifiable, and thus a UE cannot indicate to a base station which data to retransmit. Furthermore, LTE SC-PTM is a multicast/broadcast-only system, and communications cannot be switched between multicast/broadcast and unicast, such as for retransmissions to a single UE or individual retransmissions to a small set of UEs.

SUMMARY

In some aspects, a method of wireless communication, performed by a user equipment (UE), may include receiving an indication of a mode for mapping multicast broadcast quality of service (MB-QoS) flows to logical channel identifiers and group radio network temporary identifiers (G-RNTIs); identifying an MB-QoS flow from a medium access control (MAC) transport block (TB) based at least in part on the indicated mode; and decoding data included in the MB-QoS flow.

In some aspects, a UE for wireless communication may include memory and one or more processors operatively coupled to the memory. The memory and the one or more processors may be configured to receive an indication of a mode for mapping MB-QoS flows to logical channel identifiers and G-RNTIs; identify an MB-QoS flow from a MAC TB based at least in part on the indicated mode; and decode data included in the MB-QoS flow.

In some aspects, a non-transitory computer-readable medium may store one or more instructions for wireless communication. The one or more instructions, when executed by one or more processors of a UE, may cause the one or more processors to: receive an indication of a mode for mapping MB-QoS flows to logical channel identifiers and G-RNTIs; identify an MB-QoS flow from a MAC TB based at least in part on the indicated mode; and decode data included in the MB-QoS flow.

In some aspects, an apparatus for wireless communication may include means for receiving an indication of a mode for mapping MB-QoS flows to logical channel identifiers and G-RNTIs; means for identifying an MB-QoS flow from a MAC TB based at least in part on the indicated mode; and means for decoding data included in the MB-QoS flow.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 6-11 are diagrams illustrating examples of mapping multicast broadcast quality of service flows to logical channel identifiers in accordance with various aspects of the present disclosure.

DETAILED DESCRIPTION

Figure 1:
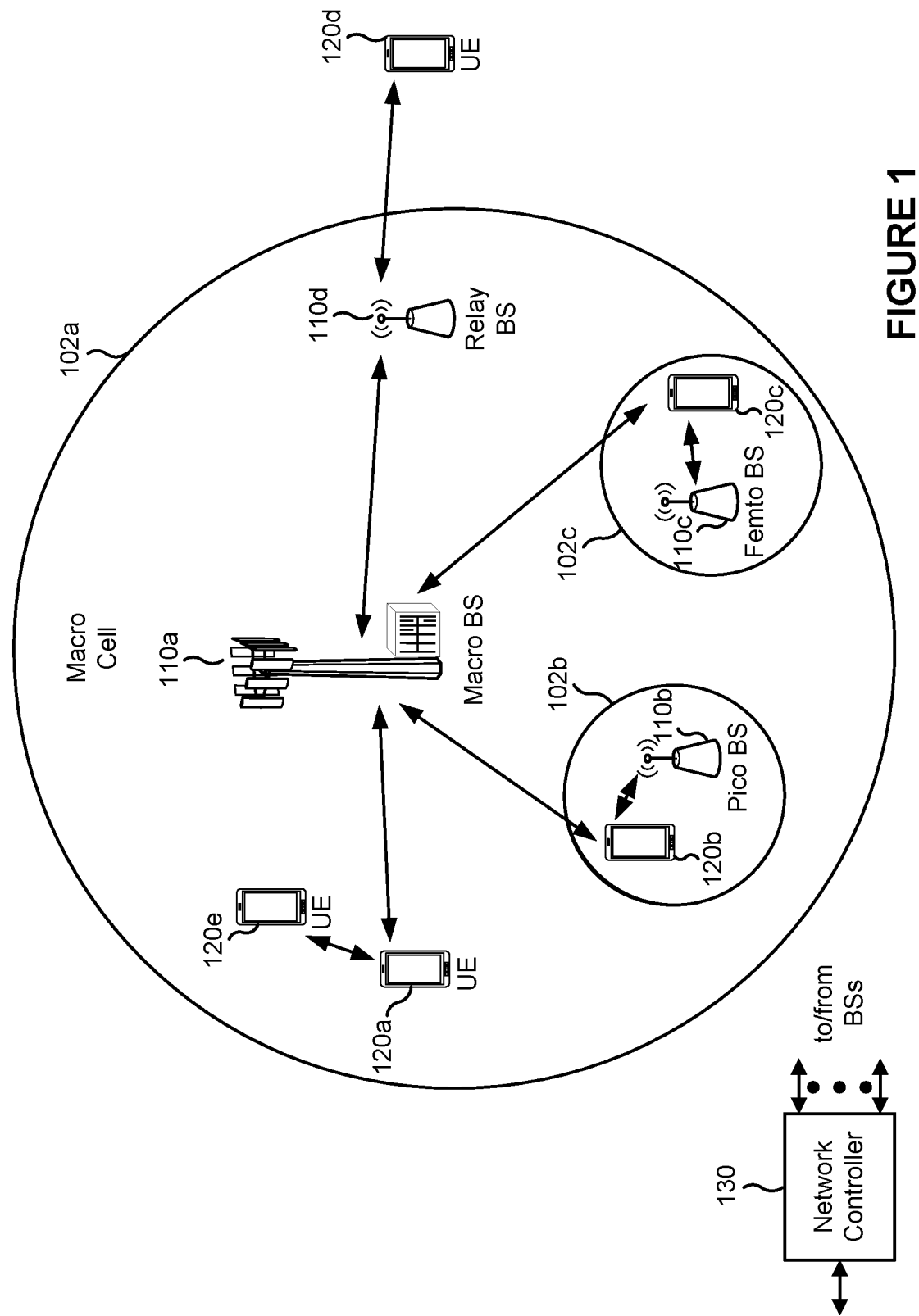
FIG. 1 is a diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to mapping multicast broadcast quality of service (MB-QoS) flows to logical channel identifiers. Some aspects more specifically relate to mapping each MB-QoS flow to a different combination of a logical channel identifier (LCID) and a group radio network temporary identifier (G-RNTI). In some aspects, each MB-QoS flow, of a set of MB-QoS flows, is mapped to a different LCID and is mapped to a different G-RNTI. In some other aspects, each MB-QoS flow, of a set of MB-QoS flows, is mapped to a different LCID and is mapped to a common G-RNTI used for multiple MB-QoS flows. In some other aspects, each MB-QoS flow, of a set of MB-QoS flows, is mapped to a different G-RNTI and is mapped to a common LCID used for multiple MB-QoS flows. In some other aspects, each MB-QoS flow, of a set of MB-QoS flows, is mapped to a fixed LCID used for all MB-QoS flows and is mapped to at least one of a G-RNTI or a multicast broadcast radio bearer (MRB) identifier that identifies a service type of the MB-QoS flow. In some other aspects, each MB-QoS flow, of a set of MB-QoS flows, is mapped to a first LCID and a G-RNTI for multicast or broadcast transmissions and is mapped to a second LCID and a cell radio network temporary identifier (C-RNTI) associated with unicast transmissions.

Particular aspects of the subject matter described in this disclosure can be implemented to realize one or more of the following potential advantages. In some examples, the described techniques can be used to enable retransmission of communications of an MB-QoS flow for higher reliability, such as by using acknowledgement (ACK) or negative acknowledgement (NACK) (collectively, ACK/NACK) feedback. In some examples, the described techniques can be used to enable such retransmissions to be transmitted in multicast/broadcast communications or in unicast communications (for example, for New Radio Mixed Mode communications), thereby increasing system flexibility and, in some cases, conserving network resources and user equipment (UE) resources by transmitting a retransmission to an individual UE rather than a group of UEs.

FIG. 1 is a diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other examples, or combinations thereof), a mesh network, among other examples, or combinations thereof. In this case, the UE 120 may perform scheduling operations, resource selection operations, or other operations described elsewhere herein as being performed by the base station 110.

Figure 2:
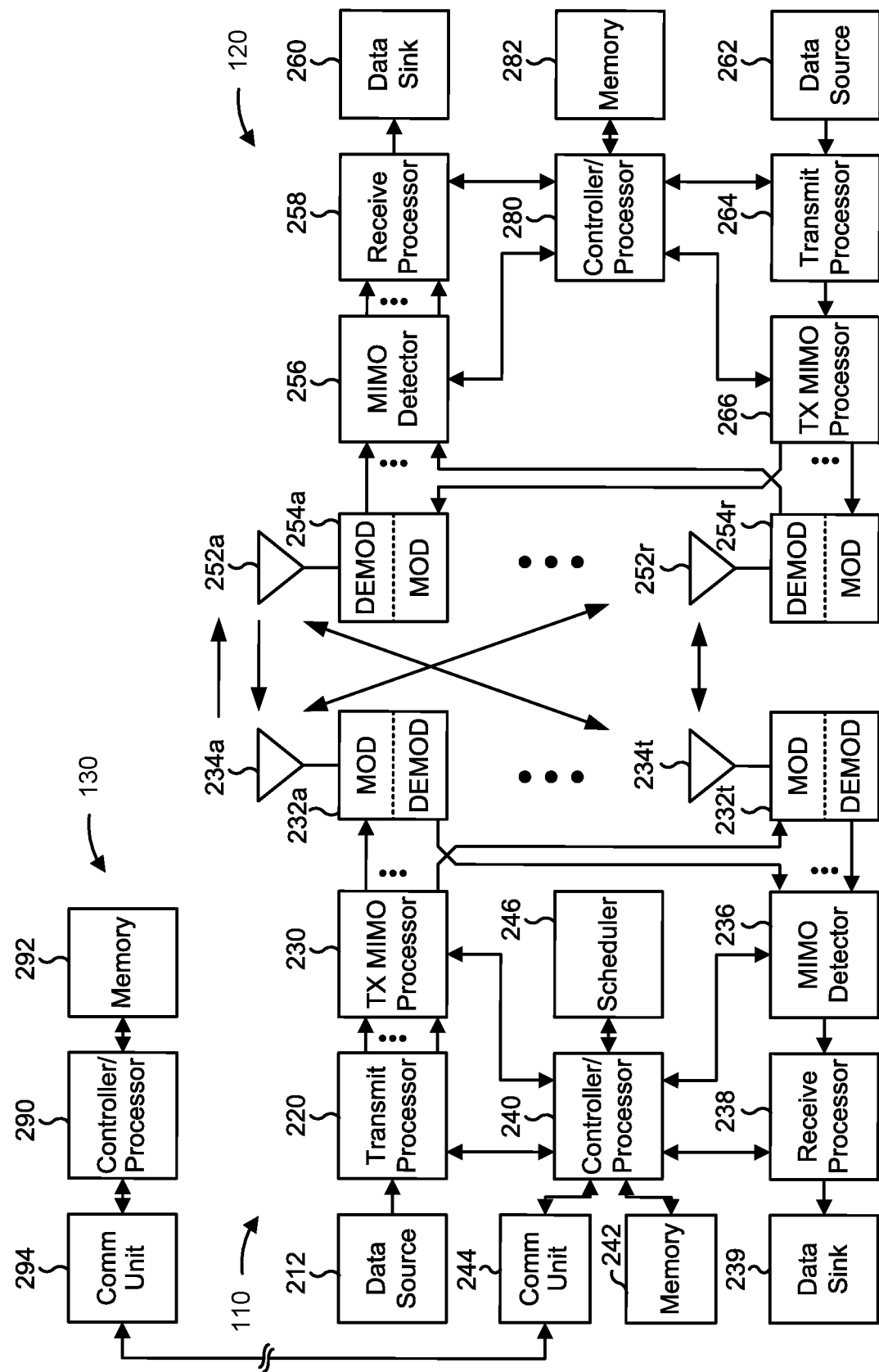
FIG. 2 is a diagram illustrating an example base station (BS) in communication with a user equipment (UE) in a wireless network in accordance with various aspects of the present disclosure.

FIG. 2 is a diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with mapping multicast broadcast quality of service flows to logical channel identifiers, as described in more detail elsewhere herein. For example, controller/processor 240 of base station 110, controller/processor 280 of UE 120, or any other component(s) of FIG. 2 may perform or direct operations of, for example, the process of FIG. 12 or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving an indication of a mode for mapping MB-QoS flows to logical channel identifiers and G-RNTIs, means for identifying an MB-QoS flow from a medium access control (MAC) TB based at least in part on the indicated mode, means for decoding data included in the MB-QoS flow, among other examples, or combinations thereof. In some aspects, such means may include one or more components of UE 120 described in connection with FIG. 2.

Figure 3:
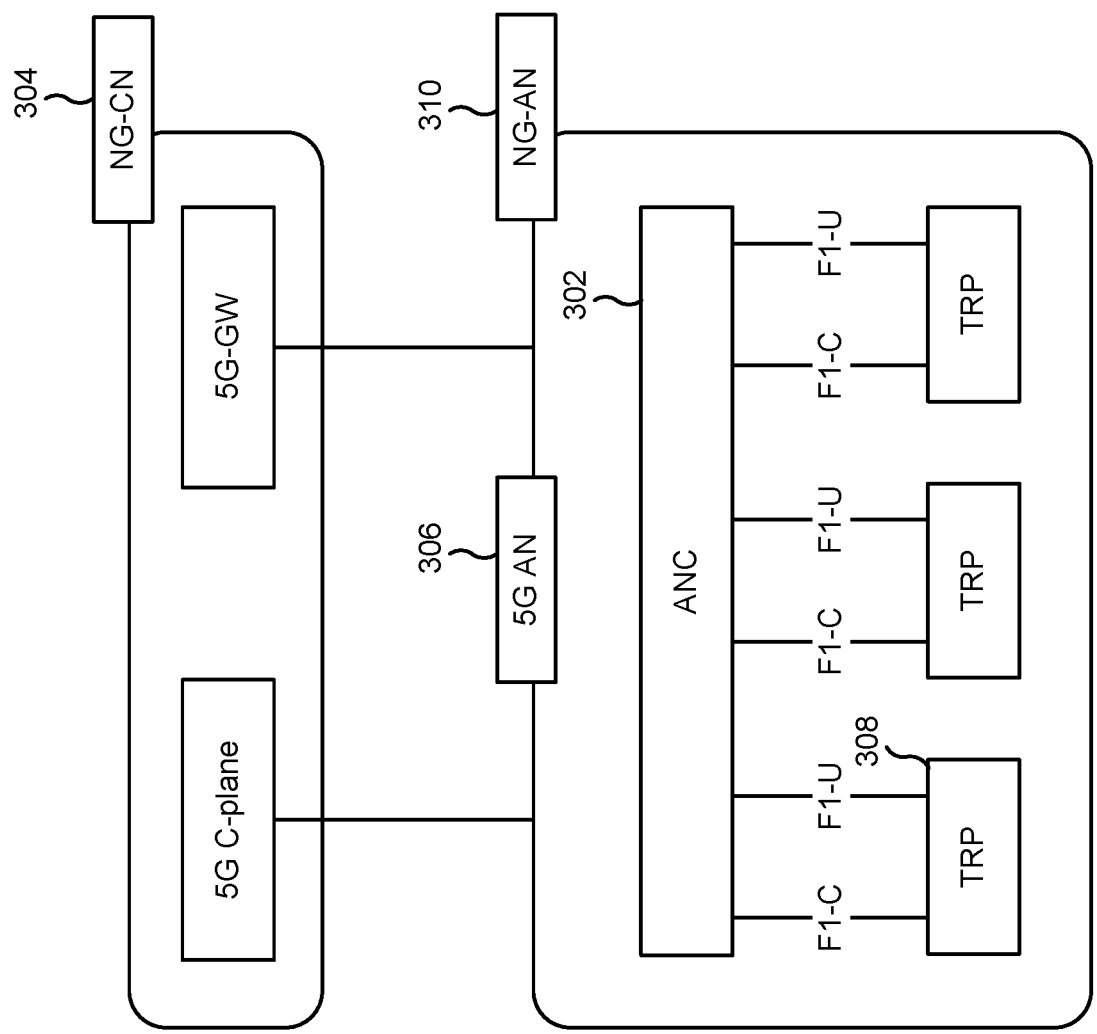
FIG. 3 is a diagram illustrating an example logical architecture of a distributed radio access network (RAN) in accordance with various aspects of the present disclosure.

FIG. 3 is a diagram illustrating an example logical architecture of a distributed radio access network (RAN) in accordance with various aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of the RAN may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 310 may support dual connectivity with NR. NG-AN 310 may share a common fronthaul for LTE and NR.

The architecture may enable cooperation between and among TRPs 308. For example, cooperation may be preset within a TRP or across TRPs via the ANC 302. In some aspects, no inter-TRP interface may be needed/present.

In some aspects, a dynamic configuration of split logical functions may be present within the architecture of the RAN.

The packet data convergence protocol (PDCP), radio link control (RLC), and MAC protocol layers may be adaptably placed at the ANC or TRP.

Figure 4:
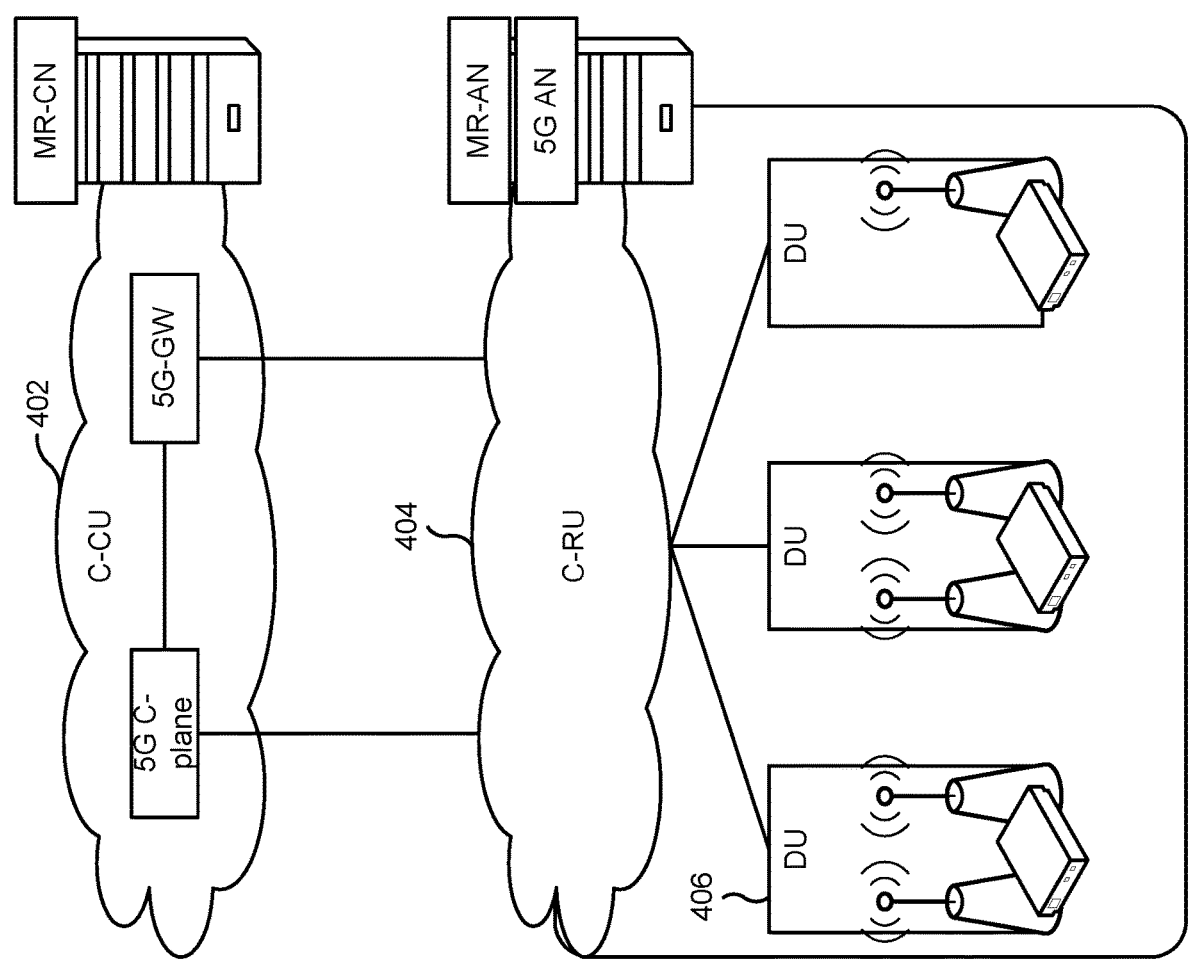
FIG. 4 is a diagram illustrating an example physical architecture of a distributed RAN in accordance with various aspects of the present disclosure.

FIG. 4 is a diagram illustrating an example physical architecture of a distributed RAN in accordance with various aspects of the present disclosure. A centralized core network unit (C-CU) 402 may host core network functions. The C-CU may be centrally deployed. C-CU functionality may be offloaded (for example, to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
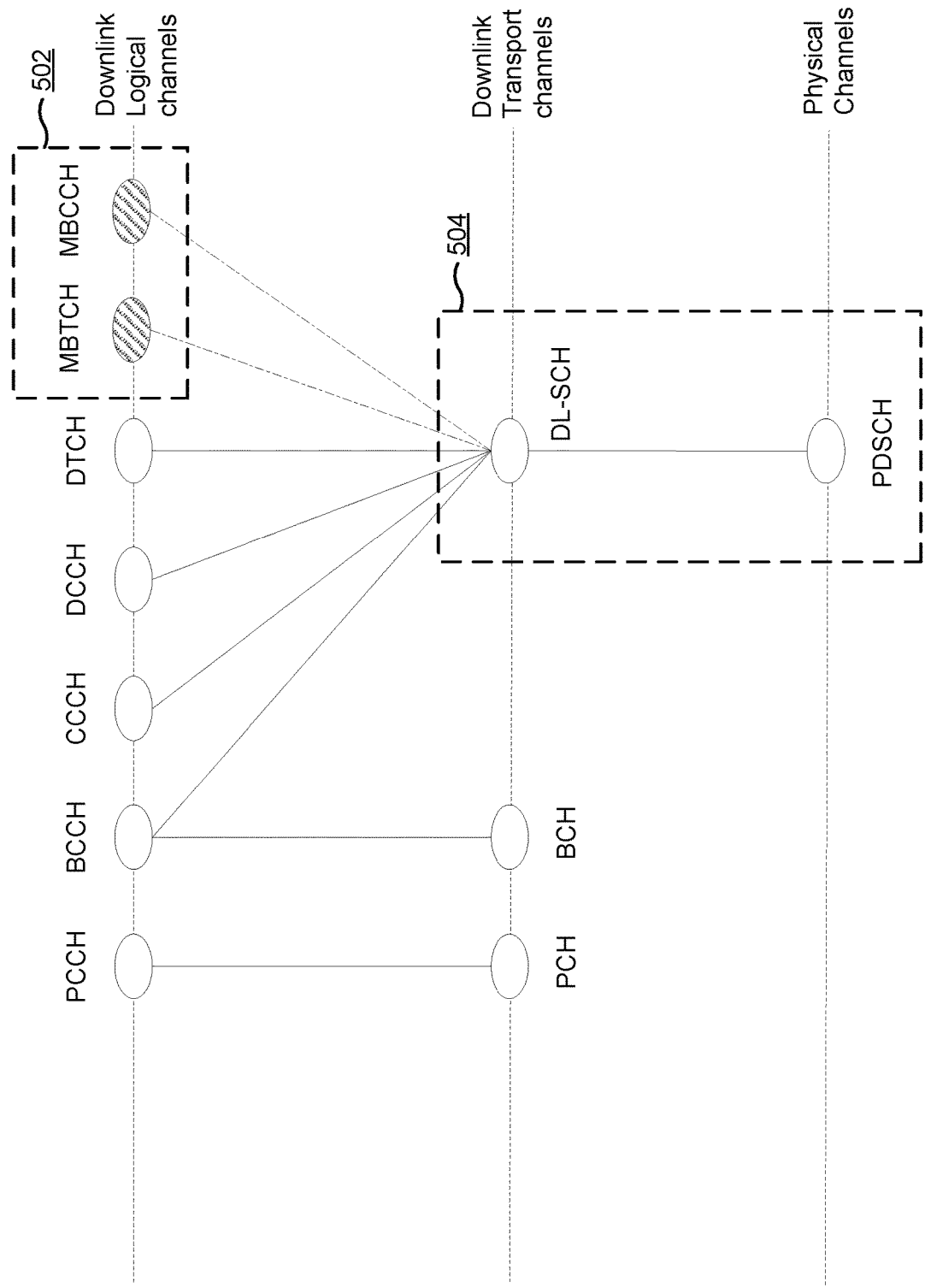
FIG. 5 is a diagram illustrating an example channel mapping for multicast broadcast communications in accordance with various aspects of the present disclosure.

FIG. 5 is a diagram illustrating an example channel mapping for multicast broadcast communications in accordance with various aspects of the present disclosure. As shown by box 502, multicast or broadcast transmissions in NR may be supported using a multicast broadcast traffic channel (MBTCH) and a multicast broadcast control channel (MBCCH). The MBTCH may carry multicast or broadcast data, while the MBCCH may carry configuration information or control information for multicast or broadcast communications to be transmitted on the MBTCH. A multicast or broadcast communication on the MBTCH may be addressed to a group of UEs using a G-RNTI. In some aspects, different MBTCHs may be used to carry multicast broadcast traffic with different quality of service (QoS) requirements. A multicast/broadcast traffic flow with associated QoS requirements or QoS parameters (for example, a group of related packets for the same multicast/broadcast service) may be referred to as an MB-QoS flow. In some aspects, there may be a one-to-one mapping between MB-QoS flows and MBTCHs. A base station or a core network device may configure a multicast broadcast radio bearer (MRB) for an MB-QoS flow. In some aspects, there may be a one-to-one mapping between MB-QoS flows and MRBs. Thus, each MBTCH may correspond to an MRB for carrying an MB-QoS flow. The MBCCH may carry configuration information for configuring the MBTCHs, and may be addressed to all UEs in a cell (for example, a physical cell or a virtual cell) using a single cell RNTI (SC-RNTI). In some aspects, there is a single MBCCH per cell (physical cell or virtual cell), and the MBCCH carries MBTCH configuration information for multiple multicast/broadcast services with different MB-QoS flows. As shown by box 504, the MBCCH and the MBTCH are logical channels, and may be mapped to a downlink shared channel (DL-SCH) transport channel, which maybe mapped to the PDSCH.

In LTE SC-PTM, a single logical channel identifier is used for both a single cell multicast broadcast control channel (SC-MCCH) that carries multicast broadcast control information and a single cell multicast broadcast traffic channel (SC-MTCH) that carries multicast broadcast traffic. LTE SC-PTM uses RLC unacknowledged mode (UM), which does not support any retransmissions, and does not support MAC hybrid automatic repeat request (HARM) or retransmissions. LTE SC-PTM is a multicast/broadcast-only system, and communications cannot be switched between multicast/broadcast and unicast, such as for retransmissions to a single UE or individual retransmissions to a small set of UEs.

To support retransmissions of multicast/broadcast communications in NR for higher reliability, different MB-QoS flows (for example, carried on different MBTCHs) should be uniquely identifiable so that a UE can indicate, to a base station, an MB-QoS flow for which a retransmission is needed. One way to uniquely identify MB-QoS flows (or corresponding MBTCHs) is to use different logical channel identifiers (LCIDs) for each MG-QoS flow. However, to conserve signaling overhead, only a limited number of LCIDs (such as 13 reserved LCIDs) are available for mapping to MB-QoS flows. In NR, a large number of MB-QoS flows may need to be supported, such as up to 1024 MB-QoS flows. Thus, there is an insufficient number of available LCIDs to map each MB-QoS flow to a different LCID. Some techniques and apparatuses described herein permit different MB-QoS flows to be uniquely identified by mapping each MB-QoS flow to a different combination of an LCID and a G-RNTI. This permits retransmission of communications of an MB-QoS flow for higher reliability, such as by using acknowledgement (ACK) or negative acknowledgement (NACK) (collectively, ACK/NACK) feedback. Furthermore, some techniques and apparatuses described herein permit such retransmissions to be transmitted in multicast/broadcast communications or in unicast communications (for example, for NR Mixed Mode communications), thereby increasing system flexibility and, in some cases, conserving network resources and UE resources by transmitting a retransmission to an individual UE rather than a group of UEs.

Figure 6:
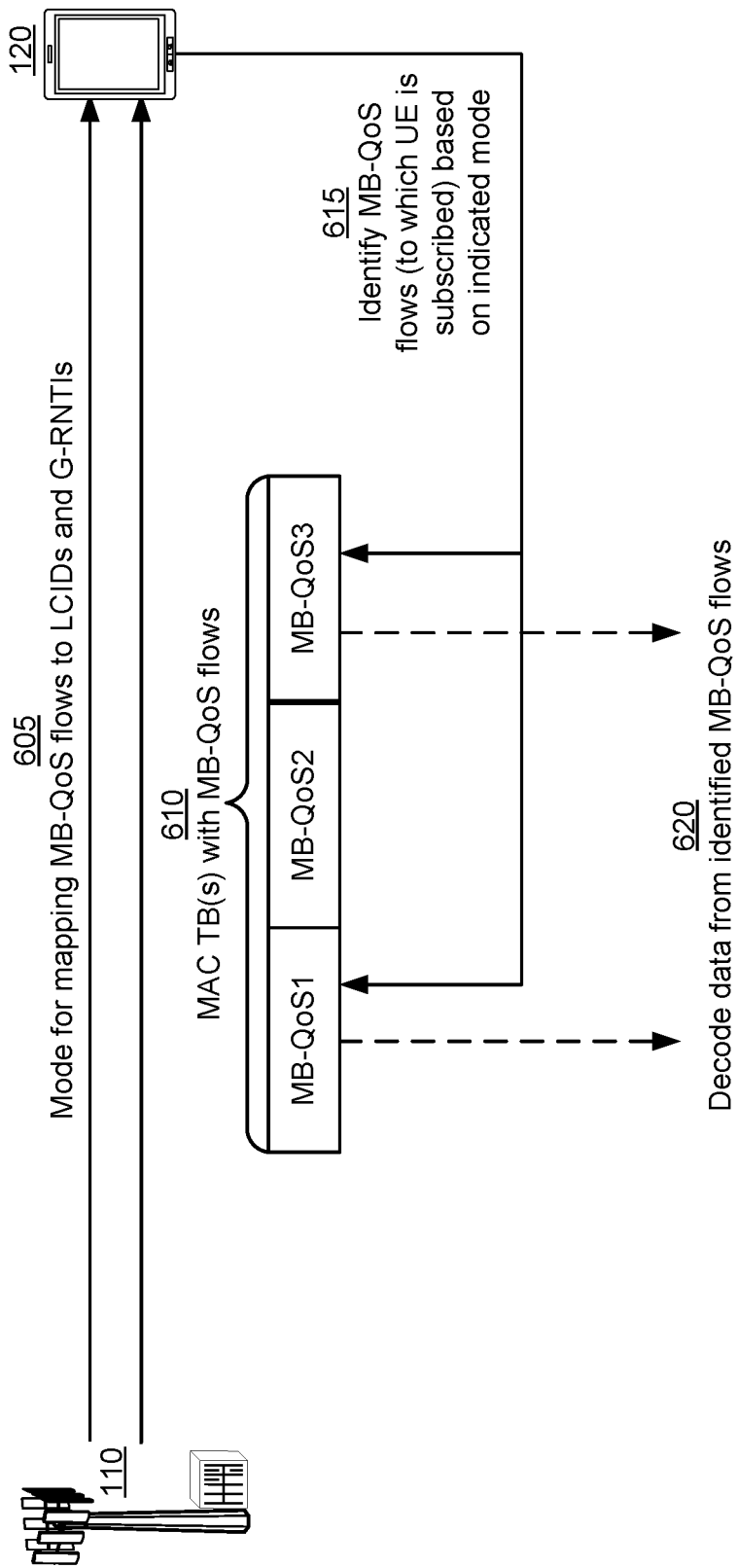

FIG. 6 is a diagram illustrating an example of mapping multicast broadcast quality of service flows to logical channel identifiers in accordance with various aspects of the present disclosure. As shown in FIG. 6, a base station 110 and a UE 120 may communicate with one another.

In a first operation 605, the base station 110 may transmit, and the UE 120 may receive, an indication of a mode for mapping MB-QoS flows to logical channel identifiers and G-RNTIs. In some aspects, the mode may include a first mode in which each MB-QoS flow, of a first set of MB-QoS flows, is mapped to a different logical channel identifier and is mapped to a different G-RNTI, as described in more detail below in connection with FIG. 7. Additionally or alternatively, the mode may include a second mode in which each MB-QoS flow, of a second set of MB-QoS flows, is mapped to a different logical channel identifier and is mapped to a common G-RNTI used for multiple MB-QoS flows, as described in more detail below in connection with FIG. 8. Additionally or alternatively, the mode may include a third mode in which each MB-QoS flow, of a third set of MB-QoS flows, is mapped to a different G-RNTI and is mapped to a common logical channel identifier used for multiple MB-QoS flows, as described in more detail below in connection with FIG. 9. Additionally or alternatively, the mode may include a fourth mode in which each MB-QoS flow, of a fourth set of MB-QoS flows, is mapped to a fixed logical channel identifier used for all MB-QoS flows and is mapped to at least one of a G-RNTI or an MRB identifier that identifies a service type of the MB-QoS flow, as described in more detail below in connection with FIG. 10. Additionally or alternatively, the mode may include a fifth mode in which each MB-QoS flow, of a fifth set of MB-QoS flows, is mapped to a first logical channel identifier and a G-RNTI for multicast or broadcast transmissions and is mapped to a second logical channel identifier and a cell RNTI (C-RNTI) associated with the UE for unicast transmissions, as described in more detail below in connection with FIG. 11.

In some aspects, the base station 110 may configure and indicate a single mode for all MB-QoS flows. In some aspects, the base station 110 may configure two or more of the modes described herein (for example, two or more of the first mode, the second mode, the third mode, the fourth mode, or the fifth mode). For example, the base station 110 may configure one mode for one set of MB-QoS flows, and may configure another mode for another set of MB-QoS flows. In this way, the base station 110 may flexibly configure MB-QoS flows depending on, for example, the types of services provided by the MB-QoS flows, a volume of traffic in a cell served by the base station 110, a number of UEs in the cell, a number of UEs subscribed to different MB-QoS flows, a volume of traffic for different MB-QoS flows, among other examples.

In some aspects, the base station 110 may determine a mode for mapping an MB-QoS flow to an LCID and a G-RNTI based at least in part on whether the MB-QoS flow is a switchable MB-QoS flow or a non-switchable MB-QoS flow. A switchable MB-QoS flow may refer to an MB-QoS flow that can be switched between an MRB (for multicast/broadcast transmission) and a dedicated radio bearer (DRB) (for unicast transmission). A non-switchable MB-QoS flow may refer to an MB-QoS flow that cannot be switched between an MRB (for multicast/broadcast transmission) and a DRB (for unicast transmission). In some aspects, the base station 110 may indicate the mode in a radio resource control (RRC) message (for example, an RRC configuration message, an RRC reconfiguration message, among other examples), in downlink control information (DCI), in a medium access control (MAC) control element (CE) (collectively, MAC-CE), in an MBCCH communication, or a combination thereof.

In a second operation 610, the base station 110 may transmit one or more medium access control (MAC) transport blocks (TBs) that include multiple MB-QoS flows. In some aspects, the base station 110 may multiplex multiple MB-QoS flows in a multicast/broadcast transmission using a single MAC TB (for example, using a single transmission of the single MAC TB or multiple transmissions of the single MAC TB). Alternatively, the base station 110 may multiplex multiple MB-QoS flows in a multicast/broadcast transmission using multiple (different) MAC TBs. In some aspects, a manner in which the multiple MB-QoS flows are multiplexed in a single MAC TB or in multiple MAC TBs may depend on a mode for mapping MB-QoS flows to LCIDs and G-RNTIs, as described in more detail below in connection with FIGS. 8-12. The base station 110 may transmit an initial transmission of an MB-QoS flow in a multicast/broadcast communication (for example, using an MRB). The base station 110 may transmit a retransmission of the initial transmission in a multicast/broadcast communication (for example, using an MRB) or in a unicast communication (for example, using a DRB).

In a third operation 615, the UE 120 may identify one or more MB-QoS flows (for example, one or more MB-QoS flows to which the UE 120 is subscribed) from a MAC TB based at least in part on the indicated mode for mapping MB-QoS flows to LCIDs and G-RNTIs. In some aspects, a manner in which the UE 120 identifies an MB-QoS flow to which the UE 120 is subscribed may also depend on the mode for mapping MB-QoS flows to LCIDs and G-RNTIs, as described in more detail below in connection with FIGS. 8-12. Additionally or alternatively, the UE 120 may use a different technique for identifying an MB-QoS flow from a multicast/broadcast communication as compared to identifying an MB-QoS flow from a unicast communication, as described in more detail below in connection with FIGS.

8-12. In the example of FIG. 6, the UE 120 is subscribed to a first MB-QoS flow (MB-QoS1) and a third MB-QoS flow (MB-QoS3).

In a fourth operation 620, the UE 120 may decode data included in the identified one or more MB-QoS flows. In some aspects, the UE 120 may identify the data for an MB-QoS flow using an LCD identifier included in a MAC TB (for example, in a MAC header or a MAC sub-header) and a G-RNTI. The UE 120 may use the G-RNTI to descramble data of the MB-QoS flow in a multicast/broadcast communication. Additionally or alternatively, the UE 120 may use the G-RNTI to identify the MB-QoS flow in a unicast communication. After identifying the data for an MB-QoS flow to which the UE 120 is subscribed, the UE 120 may decode the data. In the example of FIG. 6, the UE 120 may decode data of the first MB-QoS flow (MB-QoS1) and the third MB-QoS flow (MB-QoS3). By using one or more modes described herein, MB-QoS flows may be mapped to a limited number of LCIDs, which conserves signaling overhead while also permitting retransmission of MB-QoS for increased reliability.

Figure 7:
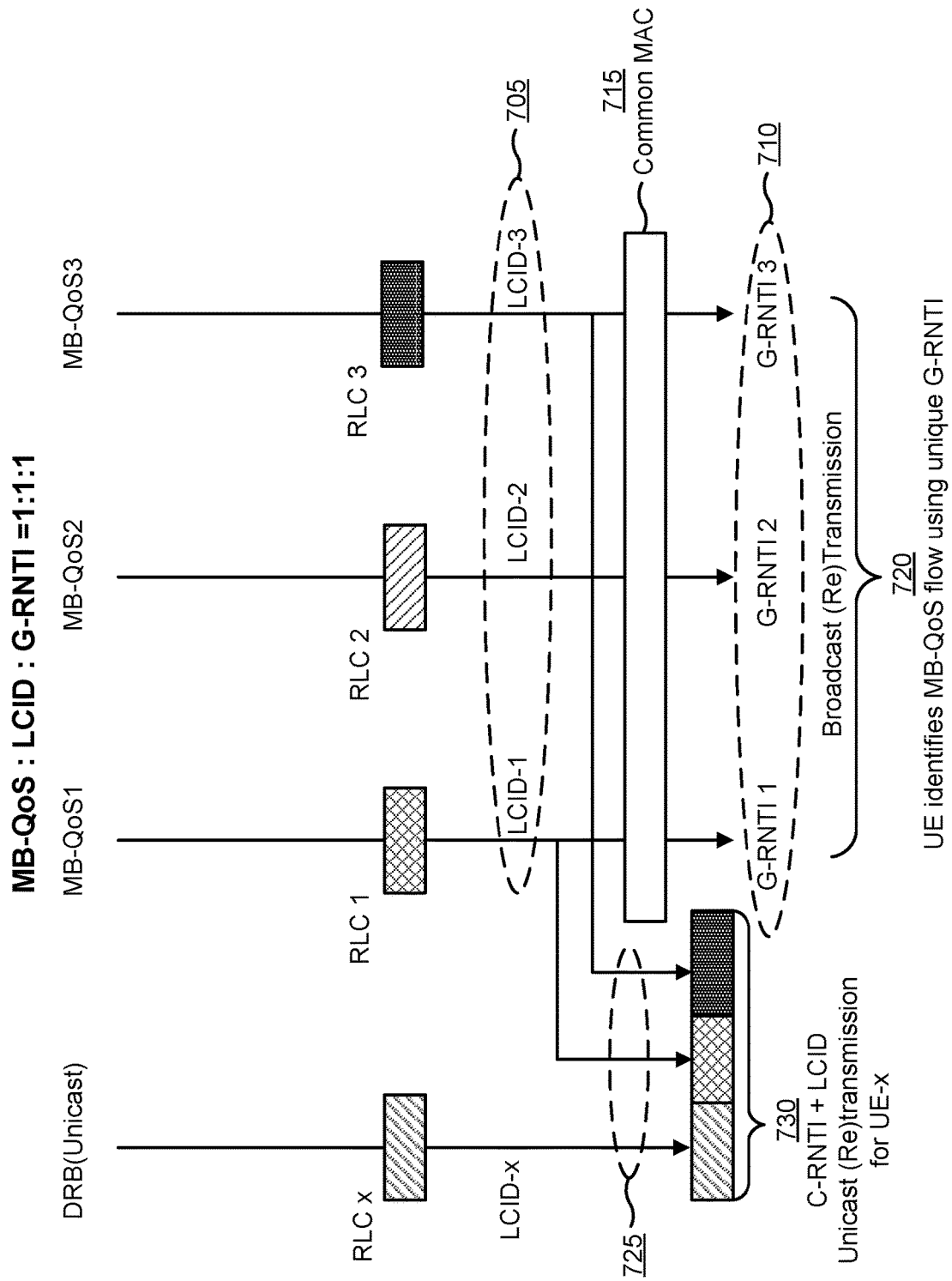

FIG. 7 is a diagram illustrating another example of mapping multicast broadcast quality of service flows to LCIDs in accordance with various aspects of the present disclosure. FIG. 7 illustrates a first mode in which each MB-QoS flow, of a set of MB-QoS flows, is mapped to a different logical channel identifier and is mapped to a different G-RNTI. As described above in connection with FIG. 6, in some aspects, a base station 110 may indicate one or more modes, for mapping MB-QoS flows to LCIDs and G-RNTIs, to a UE 120.

In a first operation 705, in some aspects, different MB-QoS flows may be mapped to different LCIDs. For example, the base station 110 may configure a one-to-one mapping between MB-QoS flows and LCIDs, where each MB-QoS flow is mapped to a different LCD. In a second operation 710, different MB-QoS flows may be mapped to different G-RNTIs. For example, the base station 110 may configure a one-to-one mapping between MB-QoS flows and G-RNTIs, where each MB-QoS flow is mapped to a different G-RNTI. In the example of FIG. 7, a first MB-QoS flow (MB-QoS1) is mapped to a first LCID (LCID-1) and a first G-RNTI (G-RNTI 1), a second MB-QoS flow (MB-QoS2) is mapped to a second LCID (LCD-2) and a second G-RNTI (G-RNTI 2), and a third MB-QoS flow (MB-QoS3) is mapped to a third LCID (LCD-3) and a third G-RNTI (G-RNTI 3). As further shown, each MB-QoS flow may be associated with a different radio link control (RLC) entity for multicast/broadcast communications (for example, a different MRB). In the example of FIG. 7, the first MB-QoS flow (MB-QoS1) is associated with a first RLC entity (RLC 1), the second MB-QoS flow (MB-QoS2) is associated with a second RLC entity (RLC 2), and the third MB-QoS flow (MB-QoS3) is associated with a third RLC entity (RLC 3).

In a third operation 715, in some aspects, the base station 110 may use a common MAC packet data unit (PDU) to multiplex multiple MB-QoS flows for a multicast broadcast communication (for example, using an MRB). The common MAC PDU may include multiple LCIDs that indicate the corresponding multiple MB-QoS flows for which data is included in a multicast/broadcast transmission associated with the common MAC PDU. For example, the common MAC PDU may include multiple MAC sub-headers that each include a different LCID.

In some aspects, the base station 110 may multiplex multiple MB-QoS flows in a multicast or broadcast transmission using a single MAC TB. In this case, because each MB-QoS flow is associated with a different G-RNTI, the base station 110 may schedule or transmit the single MAC TB multiple times (for example, by repeating the same contents of the single MAC TB in different time or frequency domain resources), and each MAC TB transmission may be scrambled using a different G-RNTI. For example, a first MAC TB transmission that includes the contents of the single MAC TB and that is associated with MB-QoS1 may be scrambled using G-RNTI 1, a second MAC TB transmission that includes the contents of the single MAC TB and that is associated with MB-QoS2 may be scrambled using G-RNTI 2, and a third MAC TB transmission that includes the contents of the single MAC TB and that is associated with MB-QoS3 may be scrambled using G-RNTI 3. Thus, the single MAC TB may be repeated multiple times with different G-RNTIs being used to scramble different repetitions. Alternatively, the base station 110 may multiplex multiple MB-QoS flows in a multicast or broadcast transmission using different MAC TBs, where each MAC TB corresponds to a different LCID and is scrambled using a different G-RNTI.

In a fourth operation 720, the UE 120 may identify an MB-QoS flow from a multicast or broadcast transmission using a unique G-RNTI corresponding to that MB-QoS flow. For example, when the UE 120 subscribes to an MB-QoS flow, the UE 120 may receive a G-RNTI for that MB-QoS flow. The UE 120 may then use that G-RNTI to descramble scheduled MBTCH transmissions. If such descrambling is successful, then the UE 120 may obtain data of the MB-QoS flow. As shown, the multicast or broadcast transmission may be an initial transmission or a retransmission.

In a fifth operation 725, the base station 110 may retransmit data of an MB-QoS flow in a unicast transmission. For example, the base station 110 may receive a NACK from a UE 120 or may not receive any ACK/NACK feedback from the UE 120 for a data transmission of an MB-QoS flow. This may cause the base station 110 to retransmit the data transmission in a unicast retransmission for the UE 120, in some aspects. To identify the MB-QoS flows for which data is included in the unicast transmission, the base station 110 may include an LCID for each of the MB-QoS flows in the unicast transmission. The base station 110 may scramble the unicast transmission using a C-RNTI for the UE 120. As further shown, the unicast transmission may be associated with a different RLC entity (RLC x) than the multicast broadcast transmissions (for example, a DRB) or may have a different LCID, such as an LCID used for unicast transmissions or DRBs. In the example of FIG. 7, the base station 110 retransmits data for MB-QoS1 and MB-QoS3 in a unicast transmission. Thus, the base station 110 includes LCID-1 and LCD-3 in the unicast transmission. If the content (bits) of a MAC TB for a retransmission is different from the content of a MAC TB in an original transmission, then HARQ retransmissions with soft combining may not be possible due to the change in the MAC TB content (bits). However, when an original transmission of a MAC TB uses a G-RNTI (such as G-RNTI x) and a retransmission of the same MAC TB (for example, the same bits or content) uses a different C-RNTI (such as C-RNTI y), then the base station 110 may transmit the original transmission and the retransmission using the same HARQ process and different redundancy versions to permit the UE 120 to perform HARQ combining (soft combining) of the original transmission and the retransmission In a sixth operation 730, the UE 120 may identify an MB-QoS flow from a unicast transmission using the C-RNTI for the UE 120 and using an LCID corresponding to that MB-QoS flow. For example, the UE 120 may be configured (for example, in an RRC message) with a C-RNTI for unicast communications between the UE 120 and the base station 110. The UE 120 may use the C-RNTI to descramble the unicast communication. If such descrambling is successful, then the UE 120 may obtain data of an MB-QoS flow using an LCID associated with that MB-QoS flow. For example, the LCID may be indicated in a MAC PDU in the unicast transmission. In this case, the unicast LCID-x, the multicast broadcast LCID-1, and the multicast broadcast LCID-3 may be multiplexed in the same MAC TB and scrambled using a UE-specific C-RNTI. In some aspects, the base station 110 may retransmit the data transmission in a multicast or broadcast transmission to one or more UEs 120, in which case those UEs 120 may obtain the data transmission as described above in connection with operation 720. When unicast LCID-x is multiplexed with broadcast LCID 1 and LCID 3, as shown in this example, it may not be possible for a receiver (for example, the UE 120) to perform HARQ combining at the receiver due to a change of MAC TB content. In some aspects, the base station 110 may retransmit LCID 1 and LCID 3 for a UE 120 in different MAC TBs, each scrambled with the C-RNTI. In this case, if the original transmission of the MAC TB, in the broadcast or multicast transmission scrambled with the G-RNTI, has the same content as the MAC TB in the unicast retransmission scrambled with the C-RNTI, then the receiver (for example, the UE 120) may to perform HARQ combining.

Using the mode described in connection with FIG. 7 to map MB-QoS flows to LCIDs and G-RNTIs, a UE 120 may be permitted to receive an MB-QoS flow to which that UE 120 is subscribed by using a G-RNTI associated with that MB-QoS flow to descramble a multicast broadcast communication. Furthermore, this mode may enable unicast retransmission of an initial multicast broadcast transmission of an MB-QoS flow using an LCID associated with that MB-QoS flow, thereby improving reliability while conserving resources of UEs 120 that successfully receive the initial multicast broadcast transmission.

Figure 8:
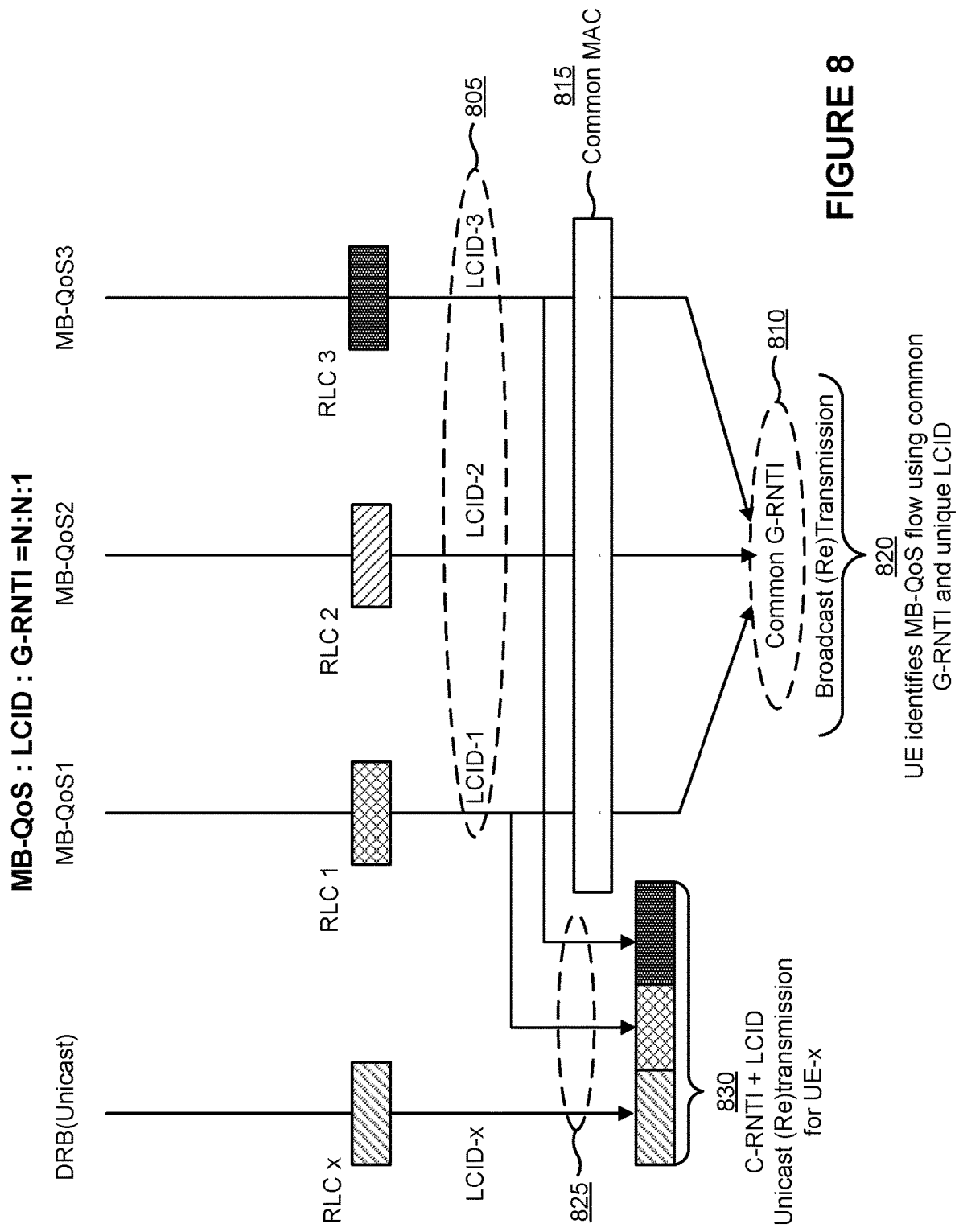

FIG. 8 is a diagram illustrating another example of mapping multicast broadcast quality of service flows to LCIDs in accordance with various aspects of the present disclosure. FIG. 8 illustrates a second mode in which each MB-QoS flow, of a set of MB-QoS flows, is mapped to a different logical channel identifier and is mapped to a common G-RNTI used for multiple MB-QoS flows. As described above in connection with FIG. 6, in some aspects, a base station 110 may indicate one or more modes, for mapping MB-QoS flows to LCIDs and G-RNTIs, to a UE 120. In some aspects, the mode described in connection with FIG. 8 may be used for a set of switchable MB-QoS flows that can be switched between an MRB for a multicast or broadcast transmission and a DRB for a unicast transmission.

In a first operation 805, in some aspects, different MB-QoS flows may be mapped to different LCIDs. For example, the base station 110 may configure a one-to-one mapping between MB-QoS flows and LCIDs, as described above in connection with FIG. 7. In a second operation 810, different MB-QoS flows may be mapped to a common G-RNTI (the same G-RNTI). For example, the base station 110 may configure a many-to-one mapping between MB-QoS flows and a G-RNTI, where each MB-QoS flow is mapped to the same G-RNTI. In the example of FIG. 8, a first MB-QoS flow (MB-QoS1) is mapped to a first LCD (LCID-1) and the common G-RNTI, a second MB-QoS flow (MB-QoS2) is mapped to a second LCID (LCD-2) and the common G-RNTI, and a third MB-QoS flow (MB-QoS3) is mapped to a third LCD (LCD-3) and the common G-RNTI. As further shown, each MB-QoS flow may be associated with a different RLC entity for multicast/broadcast communications, as described above in connection with FIG. 7.

In a third operation 815, in some aspects, the base station 110 may use a common MAC PDU to multiplex multiple MB-QoS flows for a multicast broadcast transmissions (for example, using an MRB). The common MAC PDU may include multiple LCIDs that indicate the corresponding multiple MB-QoS flows for which data is included in a multicast/broadcast transmission associated with the common MAC PDU. For example, the common MAC PDU may include multiple MAC sub-headers that each include a different LCID.

In some aspects, the base station 110 may multiplex multiple MB-QoS flows in a multicast or broadcast transmission using a single MAC TB. In this case, because each MB-QoS flow is associated with the same G-RNTI, the base station 110 may schedule or transmit the single MAC TB using a single transmission (rather than multiple transmissions as described above in connection with FIG. 7), and the single MAC TB transmission may be scrambled using the common G-RNTI. Alternatively, the base station 110 may multiplex multiple MB-QoS flows in a multicast or broadcast transmission using different MAC TBs, where each MAC TB corresponds to a different LCID and is scrambled using the common G-RNTI.

In a fourth operation 820, the UE 120 may identify an MB-QoS flow from a multicast or broadcast transmission (for example, an initial transmission or a retransmission) using the common G-RNTI, used for a set of MB-QoS flows, and an LCID corresponding to the MB-QoS flow. For example, when the UE 120 subscribes to an MB-QoS flow, the UE 120 may receive a common G-RNTI for a set of MB-QoS flows that includes the MB-QoS flow. Additionally or alternatively, the UE 120 may receive or derive a security key for the MB-QoS flow. The UE 120 may use the common G-RNTI to descramble scheduled MBTCH communications. If such descrambling is successful, then the UE 120 may obtain data of the MB-QoS flow using an LCID for the MB-QoS flow. For example, the UE 120 may read the MAC PDU to identify the LCID for the MB-QoS flow (for example, in a MAC sub-header). In some aspects, different MB-QoS flows may be associated with different security keys so that a UE 120 cannot obtain data for an MB-QoS flow to which the UE 120 is not subscribed despite having received the common G-RNTI used to descramble a communication that includes the data for the MB-QoS flow.

In a fifth operation 825, the base station 110 may retransmit data of an MB-QoS flow in a unicast transmission, in a similar manner as described above in connection with FIG. 7. To identify the MB-QoS flows for which data is included in the unicast transmission, the base station 110 may include an LCID for each of the MB-QoS flows in the unicast transmission. The base station 110 may scramble the unicast transmission using a C-RNTI for the UE 120. As further shown, the unicast transmission may be associated with a different RLC entity (RLC x) than the multicast broadcast transmissions (for example, a DRB) or may have a different LCID, such as an LCID used for unicast transmissions or DRBs. In the example of FIG. 8, the base station 110 retransmits data for MB-QoS1 and MB-QoS3 in a unicast transmission. Thus, the base station 110 includes LCID-1 and LCID-3 in the unicast transmission.

In a sixth operation 830, the UE 120 may identify an MB-QoS flow from a unicast transmission using the C-RNTI for the UE 120 and using an LCID corresponding to that MB-QoS flow, in a similar manner as described above in connection with FIG. 7. For example, the UE 120 may be configured (for example, in an RRC message) with a C-RNTI for unicast communications between the UE 120 and the base station 110. The UE 120 may use the C-RNTI to descramble the unicast communication. If such descrambling is successful, then the UE 120 may obtain data of an MB-QoS flow using an LCID associated with that MB-QoS flow, in a similar manner as described above in connection with FIG. 7. For example, the LCID may be indicated in a MAC PDU in the unicast transmission. When unicast LCID-x is multiplexed with broadcast LCID 1 and LCID 3, as shown in this example, it may not be possible for a receiver (for example, the UE 120) to perform HARQ combining at the receiver due to a change of MAC TB content. In some aspects, the base station 110 may retransmit LCID 1 and LCID 3 for a UE 120 in different MAC TBs, each scrambled with the C-RNTI. In this case, if the original transmission of the MAC TB, in the broadcast or multicast transmission scrambled with the G-RNTI, has the same content as the MAC TB in the unicast retransmission scrambled with the C-RNTI, then the receiver (for example, the UE 120) may to perform HARQ combining.

Using the mode described in connection with FIG. 8 to map MB-QoS flows to LCIDs and G-RNTIs, a UE 120 may be permitted to receive an MB-QoS flow to which that UE 120 is subscribed by using a common G-RNTI associated with that MB-QoS flow to descramble a multicast broadcast communication and by using an LCID to identify the MB-QoS flow in the descrambled communication. By using a common G-RNTI for multiple MB-QoS flows, UE resources (for example, processing resources, memory resources, battery power, among other examples) may be conserved by requiring only a single G-RNTI rather than multiple G-RNTIs for descrambling. Furthermore, this mode may enable unicast retransmission of an initial multicast broadcast transmission of an MB-QoS flow using an LCID associated with that MB-QoS flow, thereby improving reliability while conserving resources of UEs 120 that successfully receive the initial multicast broadcast transmission.

Figure 9:
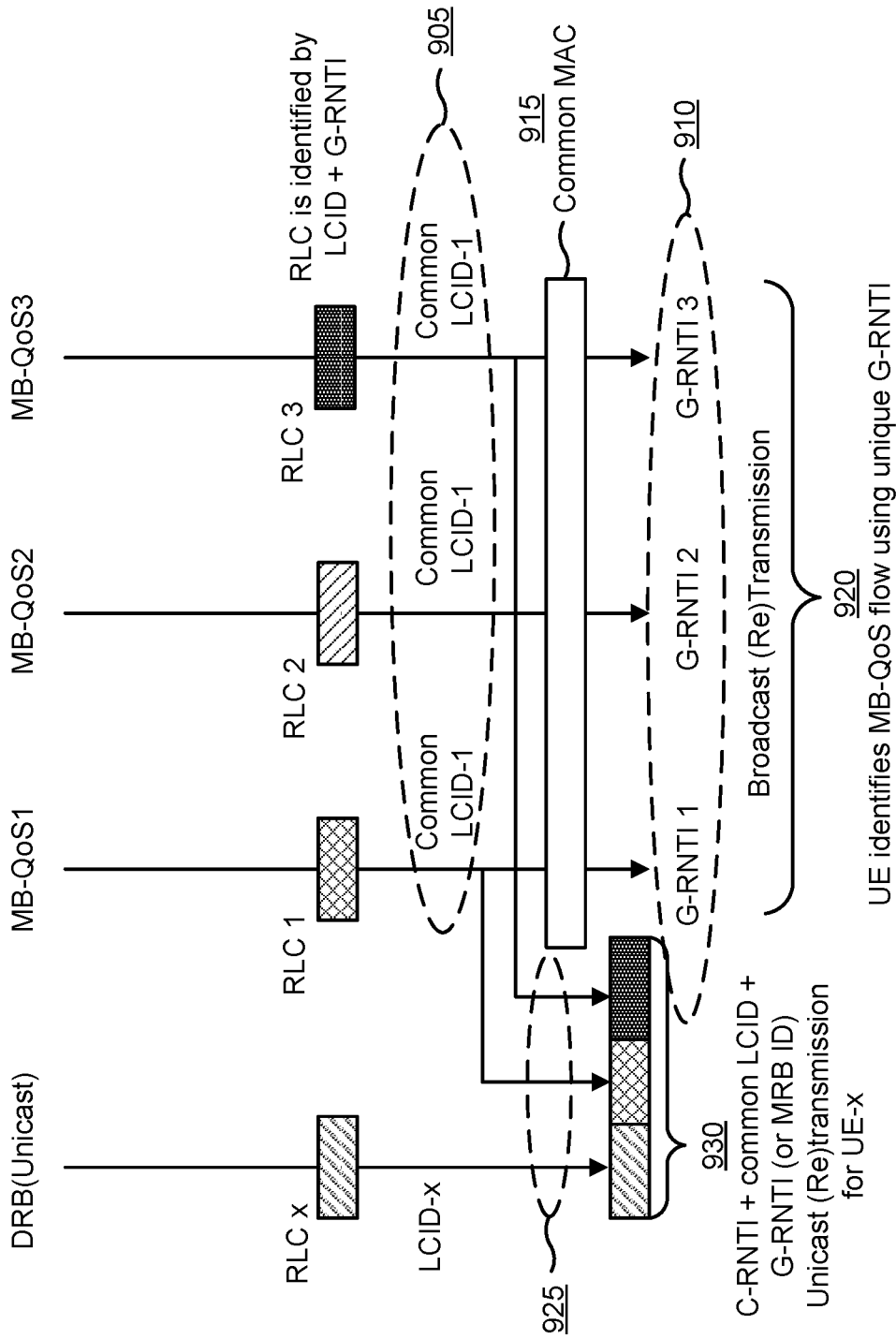

FIG. 9 is a diagram illustrating another example of mapping multicast broadcast quality of service flows to LCIDs in accordance with various aspects of the present disclosure. FIG. 9 illustrates a third mode in which each MB-QoS flow, of a set of MB-QoS flows, is mapped to a different G-RNTI and is mapped to a common LCID used for multiple MB-QoS flows. As described above in connection with FIG. 6, in some aspects, a base station 110 may indicate one or more modes, for mapping MB-QoS flows to LCIDs and G-RNTIs, to a UE 120. In some aspects, the mode described in connection with FIG. 9 may be used for a set of switchable MB-QoS flows or a set of non-switchable MB-QoS flows.

In a first operation 905, in some aspects, different MB-QoS flows may be mapped to a common LCID (the same LCD). For example, the base station 110 may configure a many-to-one mapping between MB-QoS flows and an LCID, where each MB-QoS flow is mapped to the same LCID. In a second operation 910, different MB-QoS flows may be mapped to different G-RNTIs. For example, the base station 110 may configure a one-to-one mapping between MB-QoS flows and G-RNTIs, where each MB-QoS flow is mapped to a different G-RNTI. In the example of FIG. 9, a first MB-QoS flow (MB-QoS1) is mapped to the common LCID (LCID-1) and a first G-RNTI (G-RNTI 1), a second MB-QoS flow (MB-QoS2) is mapped to the common LCID (LCID-1) and a second G-RNTI (G-RNTI 2), and a third MB-QoS flow (MB-QoS3) is mapped to the common LCID (LCID-1) and a third G-RNTI (G-RNTI 3). As further shown, each MB-QoS flow may be associated with a different RLC entity for multicast/broadcast communications, as described above in connection with FIG. 7.

In a third operation 915, in some aspects, the base station 110 may use a common MAC PDU to multiplex multiple MB-QoS flows for a multicast broadcast transmissions (for example, using an MRB). In some aspects, the common MAC PDU may include the common LCID for the multiple MB-QoS flows for which data is included in a multicast/broadcast transmission associated with the common MAC PDU.

In some aspects, the base station 110 may multiplex multiple MB-QoS flows in a multicast or broadcast transmission using a single MAC TB. In this case, because each MB-QoS flow is associated with a different G-RNTI, the base station 110 may schedule or transmit the single MAC TB multiple times (for example, by repeating the same contents of the single MAC TB in different time or frequency domain resources), and each MAC TB transmission may be scrambled using a different G-RNTI. For example, a first MAC TB transmission that includes the contents of the single MAC TB and that is associated with MB-QoS1 may be scrambled using G-RNTI 1, a second MAC TB transmission that includes the contents of the single MAC TB and that is associated with MB-QoS2 may be scrambled using G-RNTI 2, and a third MAC TB transmission that includes the contents of the single MAC TB and that is associated with MB-QoS3 may be scrambled using G-RNTI 3. Thus, the single MAC TB may be repeated multiple times with different G-RNTIs being used to scramble different repetitions. Alternatively, the base station 110 may multiplex multiple MB-QoS flows in a multicast or broadcast transmission using different MAC TBs, where each MAC TB corresponds to the same LCID and is scrambled using a different G-RNTI.

In a fourth operation 920, the UE 120 may identify an MB-QoS flow from a multicast or broadcast transmission using a unique G-RNTI corresponding to that MB-QoS flow. For example, when the UE 120 subscribes to an MB-QoS flow, the UE 120 may receive a G-RNTI for that MB-QoS flow. The UE 120 may then use that G-RNTI to descramble scheduled MBTCH communications. If such descrambling is successful, then the UE 120 may obtain data of the MB-QoS flow. As shown, the multicast or broadcast transmission may be an initial transmission or a retransmission.

In a fifth operation 925, the base station 110 may retransmit data of an MB-QoS flow in a unicast transmission, in a similar manner as described above in connection with FIG. 7. To identify the MB-QoS flows for which data is included in the unicast transmission, the base station 110 may include a G-RNTI for each of the MB-QoS flows in the unicast transmission. In some aspects, the base station 110 may also include the LCID of the MB-QoS flows in the unicast transmission, such that an MB-QoS flow can be identified by a combination of the common LCID and a unique G-RNTI for the MB-QoS flow. The base station 110 may scramble the unicast transmission using a C-RNTI for the UE 120. As further shown, the unicast transmission may be associated with a different RLC entity (RLC x) than the multicast broadcast transmissions (for example, a DRB) or may have a different LCID, such as an LCID used for unicast transmissions or DRBs. In the example of FIG. 9, the base station 110 retransmits data for MB-QoS1 and MB-QoS3 in a unicast transmission. Thus, the base station 110 includes G-RNTI 1 and the common LCD, to identify MB-QoS1, as well as G-RNTI 3 and the common LCID, to identify MB-QoS3, in the unicast transmission. In some aspects, a G-RNTI may be indicated in a MAC PDU, such as a MAC sub-header, in the unicast transmission. When unicast LCID-x is multiplexed with broadcast LCID 1 and LCID 3, as shown in this example, it may not be possible for a receiver (for example, the UE 120) to perform HARQ combining at the receiver due to a change of MAC TB content. In some aspects, the base station 110 may retransmit LCID 1 and LCID 3 for a UE 120 in different MAC TBs, each scrambled with the C-RNTI. In this case, if the original transmission of the MAC TB, in the broadcast or multicast transmission scrambled with the G-RNTI, has the same content as the MAC TB in the unicast retransmission scrambled with the C-RNTI, then the receiver (for example, the UE 120) may to perform HARQ combining.

In a sixth operation 930, the UE 120 may identify an MB-QoS flow from a unicast transmission using the C-RNTI for the UE 120, using the common LCID, and using a G-RNTI corresponding to that MB-QoS flow. For example, the UE 120 may be configured (for example, in an RRC message) with a C-RNTI for unicast communications between the UE 120 and the base station 110. The UE 120 may use the C-RNTI to descramble the unicast communication. If such descrambling is successful, then the UE 120 may obtain data of an MB-QoS flow using the common LCID and a G-RNTI associated with that MB-QoS flow. For example, the common LCID and the G-RNTI may be indicated in a MAC PDU in the broadcast and/or unicast transmission. In this case, the unicast LCID-x, the multicast broadcast LCID-1, and the multicast broadcast LCID-3 may be multiplexed in the same MAC TB and scrambled using a UE-specific C-RNTI.

Using the mode described in connection with FIG. 9 to map MB-QoS flows to LCIDs and G-RNTIs, a UE 120 may be permitted to receive an MB-QoS flow to which that UE 120 is subscribed by using a G-RNTI associated with that MB-QoS flow to descramble a multicast broadcast communication. Furthermore, this mode may enable unicast retransmission of an initial multicast broadcast transmission of an MB-QoS flow using a common LCID associated with that MB-QoS flow and the G-RNTI associated with that MB-QoS flow, thereby improving reliability while conserving resources of UEs 120 that successfully receive the initial multicast broadcast transmission. Furthermore, this mode may reduce signaling overhead by using a common LCID for a group of MB-QoS flows, thereby requiring fewer LCIDs than if each MB-QoS flow were associated with a unique LCD.

Figure 10:
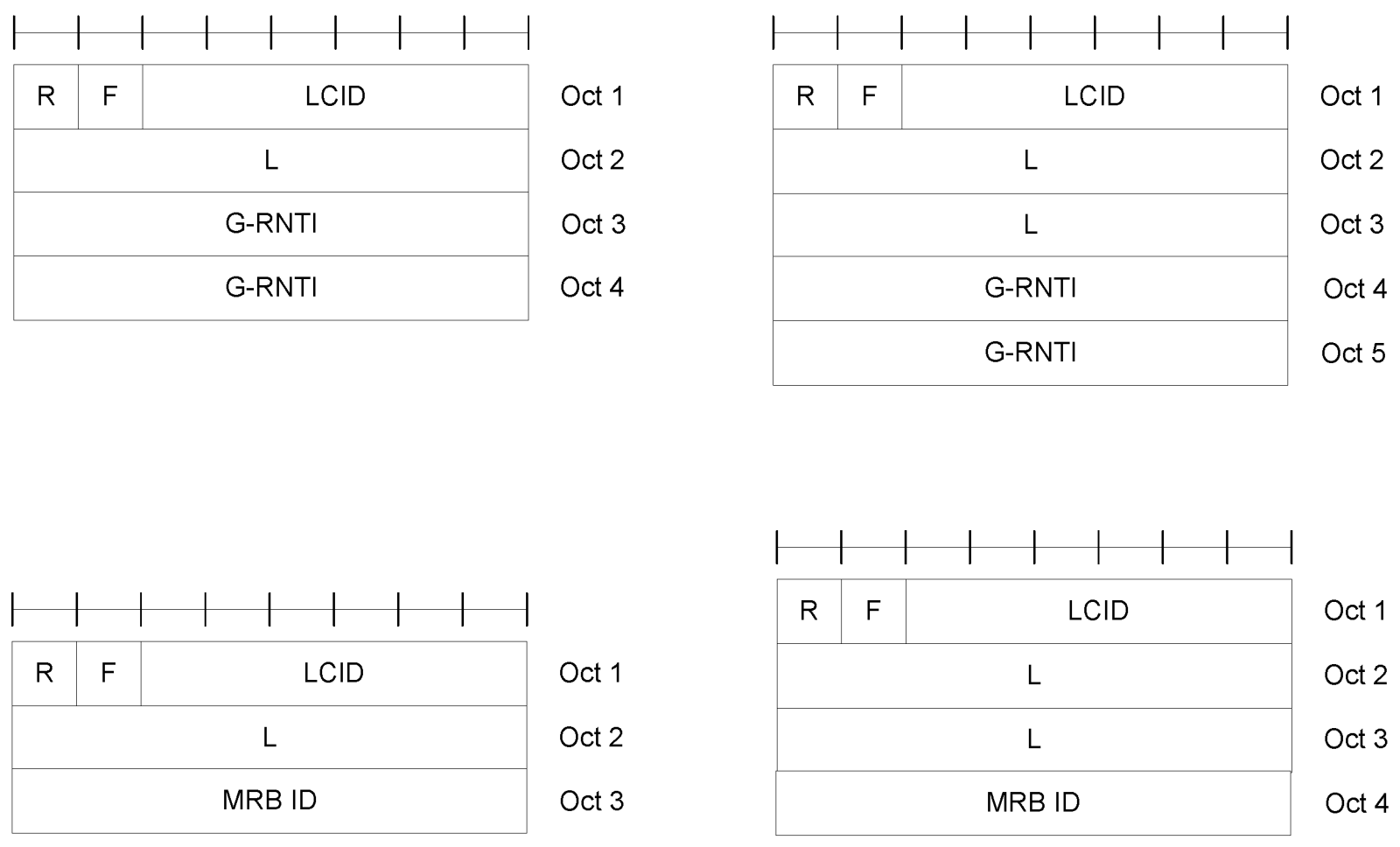

FIG. 10 is a diagram illustrating another example of mapping multicast broadcast quality of service flows to LCIDs in accordance with various aspects of the present disclosure. FIG. 10 illustrates a fourth mode in which each MB-QoS flow, of a set of MB-QoS flows, is mapped to a different identifier (for example, a different G-RNTI or a different MRB identifier) and is mapped to a fixed LCID used for all MB-QoS flows. As described above in connection with FIG. 6, in some aspects, a base station 110 may indicate one or more modes, for mapping MB-QoS flows to LCIDs and G-RNTIs, to a UE 120.

In some aspects, different MB-QoS flows may be mapped to a fixed LCID (the same LCID) that is used for all MB-QoS flows. In this case, each MB-QoS flow is mapped to the same LCID, which is a fixed LCID reserved for multicast/broadcast communications. In some aspects, different MB-QoS flows may be mapped to different G-RNTIs, in a similar manner as described elsewhere herein. Additionally or alternatively, different MB-QoS flows may be mapped to different MRB identifiers (MRB IDs). Four different example MAC PDU sub-headers, used to indicate an LCID and one of a G-RNTI or an MRB ID for an MB-QoS flow, are shown in FIG. 10.

Using a fixed LCID and a unique G-RNTI or MRB ID, transmission and identification of MB-QoS flows may be performed in a similar manner as described above in connection with FIG. 9, where a common LCID and a unique G-RNTI are used. However, in the mode of FIG. 10, a fixed LCID (which may be used for all MB-QoS flows) may be used instead of a common LCID (which may be used for a set of MB-QoS flows that is a subset of all MB-QoS flows). Furthermore, while a unique G-RNTI may be used to identify an MB-QoS flow in some aspects, in other aspects, a unique MRB ID may be used to identify an MB-QoS flow. When a unique MRB ID is used, a common G-RNTI may be used for different MB-QoS flows (for example, all MB-QoS flows). For unicast transmissions, the fixed LCID and one of the G-RNTI or the MRB ID may be included in a MAC PDU (for example, in a MAC PDU sub-header), as shown in FIG. 10. In some aspects, the fixed LCID may be used to identify the MBTCH, and a unique G-RNTI or a unique MRB ID may be used to identify a multicast/broadcast service type. By using a fixed LCD, the mode described in connection with FIG. 10 may reduce signaling overhead by using the same LCID for all MB-QoS flows, thereby requiring fewer LCIDs than if each MB-QoS flow were associated with a unique LCID or if different sets of MB-QoS flows were associated with different LCIDs.

Figure 11:
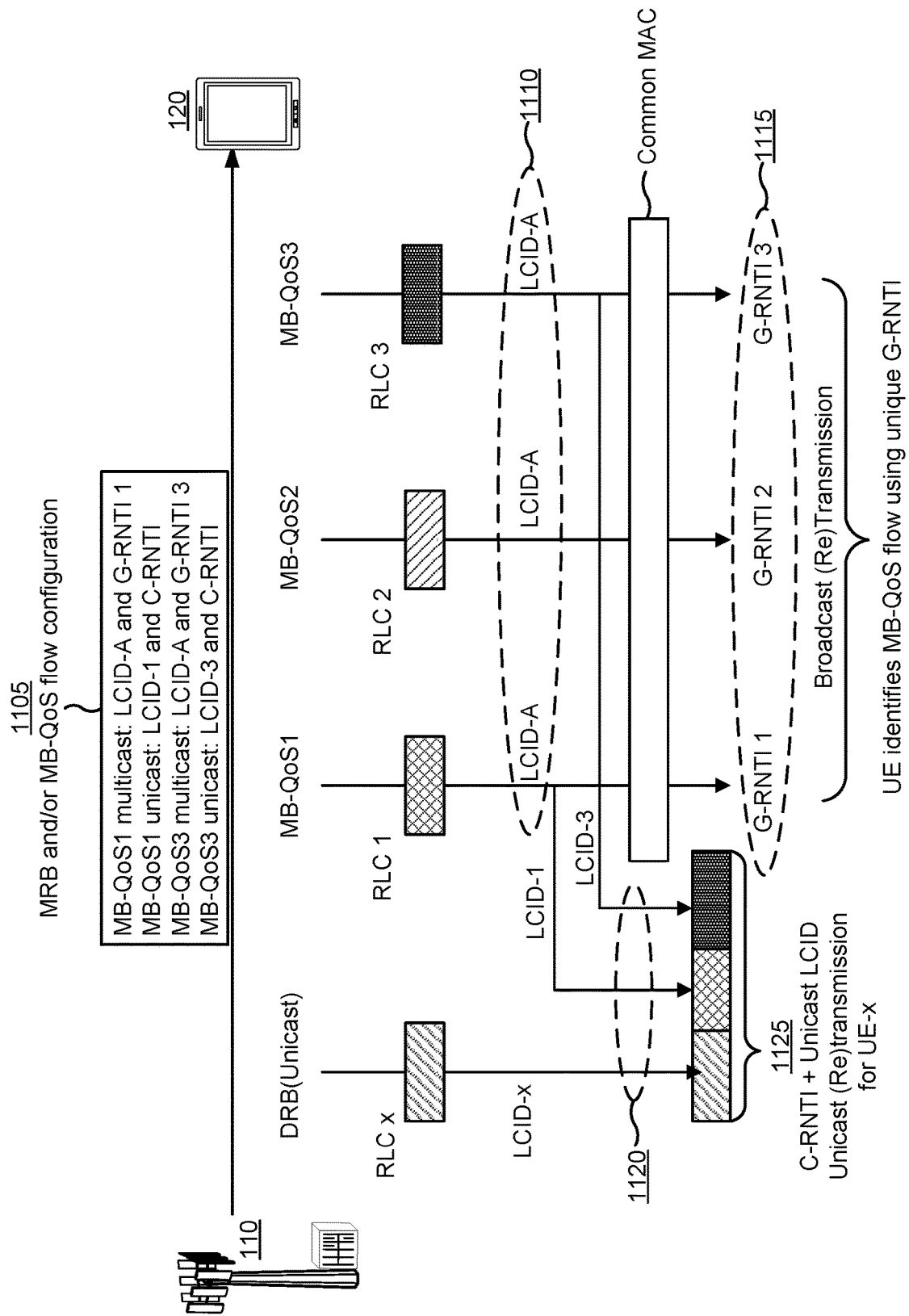

FIG. 11 is a diagram illustrating another example of mapping multicast broadcast quality of service flows to LCIDs in accordance with various aspects of the present disclosure. FIG. 11 illustrates a mode in which each MB-QoS flow, of a set of MB-QoS flows, is mapped to a first LCD and a G-RNTI for multicast or broadcast transmissions and is mapped to a second LCID and a C-RNTI for unicast transmissions. As described above in connection with FIG. 6, in some aspects, a base station 110 may indicate one or more modes, for mapping MB-QoS flows to LCIDs and G-RNTIs, to a UE 120. FIG. 11 shows a proposed enhancement to an NR MAC PDU sub-header (for example, enhancements over section 6.1.2 of 3GPP TS 38.321).

In a first operation 1105, in some aspects, when the base station 110 configures an MRB (for example, for an MB-QoS flow), then the base station 110 may indicate a first LCID (shown as LCID-A for MB-QoS1) to be used when data of the MB-QoS flow is transmitted in a multicast/broadcast communication (for example, using an MRB) and a second LCID (shown as LCID-1 for MB-QoS1) to be used when data of the MB-QoS flow is transmitted in a unicast communication (for example, using a DRB). The base station 110 may also indicate a G-RNTI (shown as G-RNTI 1 for MB-QoS1) to be used to obtain (descramble) multicast/broadcast communications of the MB-QoS flow using the first LCID, and may indicate a C-RNTI to be used by the UE 120 to obtain (descramble) unicast communications of the MB-QoS flow using the second LCID.

In some aspects, the base station 110 may indicate (to the UE 120) the first LCID, the G-RNTI, the second LCID, the C-RNTI, or a combination thereof in an RRC message (for example, a unicast RRC message). In some aspects, the base station 110 may indicate all four of these parameters in the RRC message. In some aspects, the base station 110 may indicate (to the UE 120) the second LCD and the C-RNTI in the RRC message, and may indicate the first LCID and the G-RNTI using a multicast control channel (for example, the MBCCH).

In a second operation 1110, when the base station 110 transmits data of the MB-QoS flow in a multicast/broadcast transmission, the base station 110 may use the first LCID. In a third operation 1115, the base station 110 may scramble the multicast/broadcast transmission using the G-RNTI. The UE 120 may identify the MB-QoS flow or obtain the data of the MB-QoS flow using the G-RNTI, the first LCD, or a combination thereof, in a similar manner as described elsewhere herein.

In a fourth operation 1120, when the base station 110 transmits data of the MB-QoS flow in a unicast transmission, the base station 110 may use the second LCD and may scramble the multicast/broadcast transmission using the C-RNTI. In a fifth operation 1125, the UE 120 may identify the MB-QoS flow or obtain the data of the MB-QoS flow using the C-RNTI and the second LCID, in a similar manner as described elsewhere herein.

By using different LCIDs for an MB-QoS flow depending on whether data of the MB-QoS flow is transmitted in a multicast/broadcast communication or a unicast communication, the mode described in connection with FIG. 11 may reduce signaling overhead by reusing the same LCD for multiple MB-QoS flows. For example, the same LCID may be used for different unicast transmissions that use different UE-specific C-RNTIs. Furthermore, MB-QoS flows associated with different G-RNTIs may use the same LCID while still allowing a UE 120 to differentiate between MB-QoS flows using different G-RNTIs.

In some aspects, a non-switchable MRB may be reconfigured to a switchable MRB. A switchable MRB may refer to an MRB that can be switched between multicast/broadcast transmissions (for example, using a G-RNTI) and unicast transmissions (for example, using a C-RNTI). A non-switchable MRB may refer to an MRB that cannot be switched between multicast/broadcast transmissions and unicast transmissions. In some aspects, a base station 110 may configure a non-switchable MRB with a first LCID for multicast/broadcast transmissions. When the base station 110 reconfigures the MRB from non-switchable to switchable, the base station 110 may indicate a second LCID for the MRB for unicast transmissions. The base station 110 may reconfigure the MRB with a cell unique LCID or may indicate the second LCID in, for example, a multicast broadcast control channel communication (MBCCH), an RRC message (for example, an RRC reconfiguration message), or a combination thereof. In this way, the base station 110 may increase flexibility for transmission and retransmission of MB-QoS flows.

Figure 12:
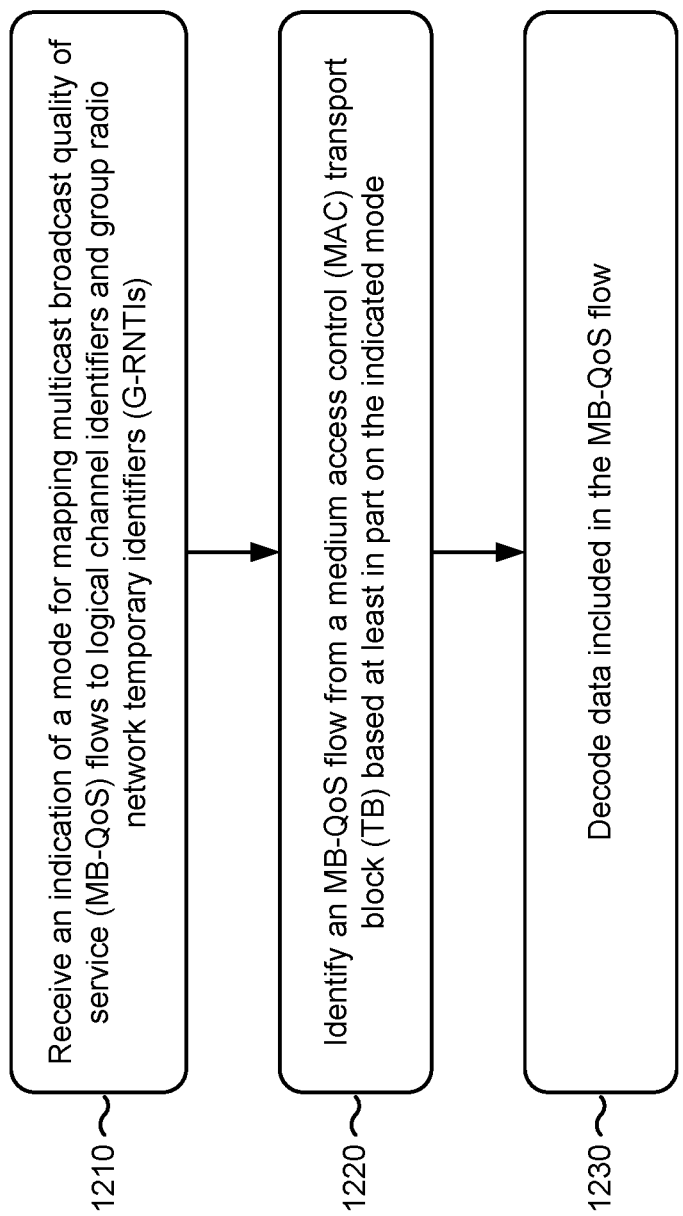
FIG. 12 is a diagram illustrating an example process performed by a UE in accordance with various aspects of the present disclosure.

FIG. 12 is a diagram illustrating an example process performed, for example, by a UE, in accordance with various aspects of the present disclosure. The example process is an example where the UE (for example, UE 120) performs operations associated with mapping multicast broadcast quality of service flows to LCIDs.

As shown in FIG. 12, in some aspects, the process may include receiving an indication of a mode for mapping MB-QoS flows to LCIDs and G-RNTIs (block 1210). For example, the UE (for example, using receive processor 258, controller/processor 280, memory 282, or reception component 1302 of FIG. 13, among other examples) may receive an indication of a mode for mapping MB-QoS flows to LCIDs and G-RNTIs, as described above.

As further shown in FIG. 12, in some aspects, the process may include identifying an MB-QoS flow from a MAC TB based at least in part on the indicated mode (block 1220). For example, the UE (for example, using receive processor 258, controller/processor 280, memory 282, or identification component 1310 of FIG. 13, among other examples) may identify an MB-QoS flow from a MAC TB based at least in part on the indicated mode, as described above.

As further shown in FIG. 12, in some aspects, the process may include decoding data included in the MB-QoS flow (block 1230). For example, the UE (for example, using receive processor 258, controller/processor 280, memory 282, or decoding component 1312 of FIG. 13, among other examples) may decode data included in the MB-QoS flow, as described above.

The process may include additional aspects, such as any single aspect or any combination of aspects described below or in connection with one or more other processes described elsewhere herein.

In a first aspect, the mode includes a mode in which each MB-QoS flow, of a set of MB-QoS flows, is mapped to a different logical channel identifier and is mapped to a different G-RNTI.

In a second aspect, alone or in combination with the first aspect, the process includes identifying (for example, using identification component 1310 of FIG. 13) the MB-QoS flow from a multicast or broadcast transmission based at least in part on a unique G-RNTI corresponding to the MB-QoS flow.

In a third aspect, alone or in combination with one or more of the first and second aspects, multiple MB-QoS flows are multiplexed in the multicast or broadcast transmission using one of: a single MAC TB that is transmitted multiple times, wherein each MAC TB transmission is scrambled using a different G-RNTI, or different MAC TBs corresponding to different logical channel identifiers, wherein each MAC TB is scrambled using a different G-RNTI.

In a fourth aspect, alone or in combination with one or more of the first through third aspects, the process includes identifying (for example, using identification component 1310 of FIG. 13) the MB-QoS flow from a unicast transmission based at least in part on a C-RNTI for the UE and a unique logical channel identifier corresponding to the MB-QoS flow.

In a fifth aspect, alone or in combination with one or more of the first through fourth aspects, the mode includes a mode in which each MB-QoS flow, of a set of MB-QoS flows, is mapped to a different logical channel identifier and is mapped to a common G-RNTI used for multiple MB-QoS flows.

In a sixth aspect, alone or in combination with one or more of the first through fifth aspects, the process includes identifying (for example, using identification component 1310 of FIG. 13) the MB-QoS flow from a multicast or broadcast transmission based at least in part on a logical channel identifier corresponding to the MB-QoS flow.

In a seventh aspect, alone or in combination with one or more of the first through sixth aspects, multiple MB-QoS flows are multiplexed in the multicast or broadcast transmission using one of: a single MAC TB scrambled using the common G-RNTI, or different MAC TBs corresponding to different logical channel identifiers, wherein each MAC TB is scrambled using the common G-RNTI.

In an eighth aspect, alone or in combination with one or more of the first through seventh aspects, the process includes identifying (for example, using identification component 1310 of FIG. 13) the MB-QoS flow from a unicast transmission based at least in part on a C-RNTI for the UE and a unique logical channel identifier corresponding to the MB-QoS flow.

In a ninth aspect, alone or in combination with one or more of the first through eighth aspects, the set of MB-QoS flows includes one or more switchable MB-QoS flows that can be switched between a multicast broadcast radio bearer, for a multicast or broadcast transmission, and a dedicated radio bearer for a unicast transmission.

In a tenth aspect, alone or in combination with one or more of the first through ninth aspects, the mode includes a mode in which each MB-QoS flow, of a set of MB-QoS flows, is mapped to a different G-RNTI and is mapped to a common logical channel identifier used for multiple MB-QoS flows.

In an eleventh aspect, alone or in combination with one or more of the first through tenth aspects, the process includes identifying (for example, using identification component 1310 of FIG. 13) the MB-QoS flow from a multicast or broadcast transmission based at least in part on a unique G-RNTI corresponding to the MB-QoS flow.

In a twelfth aspect, alone or in combination with one or more of the first through eleventh aspects, multiple MB-QoS flows are multiplexed in the multicast or broadcast transmission using one of: a single MAC TB that is transmitted multiple times, wherein each MAC TB transmission is scrambled using a different G-RNTI, or different MAC TBs corresponding to the common logical channel identifier, wherein each MAC TB is scrambled using a different G-RNTI.

In a thirteenth aspect, alone or in combination with one or more of the first through twelfth aspects, the process includes identifying (for example, using identification component 1310 of FIG. 13) the MB-QoS flow from a unicast transmission based at least in part on a C-RNTI for the UE, the common logical channel identifier, and a unique G-RNTI corresponding to the MB-QoS flow.

In a fourteenth aspect, alone or in combination with one or more of the first through thirteenth aspects, the set of MB-QoS flows includes one or more non-switchable MB-QoS flows that cannot be switched between a multicast broadcast radio bearer, for a multicast or broadcast transmission, and a dedicated radio bearer for a unicast transmission.

In a fifteenth aspect, alone or in combination with one or more of the first through fourteenth aspects, the set of MB-QoS flows includes one or more switchable MB-QoS flows that can be switched between a multicast broadcast radio bearer, for a multicast or broadcast transmission, and a dedicated radio bearer for a unicast transmission.

In a sixteenth aspect, alone or in combination with one or more of the first through fifteenth aspects, the mode includes a mode in which each MB-QoS flow, of a set of MB-QoS flows, is mapped to a fixed logical channel identifier used for all MB-QoS flows and is mapped to at least one of a G-RNTI or a multicast broadcast radio bearer identifier that identifies a service type of the MB-QoS flow.

In a seventeenth aspect, alone or in combination with one or more of the first through sixteenth aspects, the process includes identifying (for example, using identification component 1310 of FIG. 13) the MB-QoS flow based at least in part on a logical channel identifier and at least one of a G-RNTI or a multicast broadcast radio bearer identifier indicated in a MAC PDU sub-header for the MB-QoS flow.

In an eighteenth aspect, alone or in combination with one or more of the first through seventeenth aspects, the mode includes a mode in which each MB-QoS flow, of a set of MB-QoS flows, is mapped to a first logical channel identifier and a G-RNTI for multicast or broadcast transmissions and is mapped to a second logical channel identifier and a C-RNTI associated with the UE for unicast transmissions.

In a nineteenth aspect, alone or in combination with one or more of the first through eighteenth aspects, the first logical channel identifier and the G-RNTI are configured using a multicast control channel, and the second logical channel identifier and the C-RNTI are configured in a radio resource control message.

In a twentieth aspect, alone or in combination with one or more of the first through nineteenth aspects, the first logical channel identifier, the G-RNTI, the second logical channel identifier, and the C-RNTI are configured in a radio resource control message.

In a twenty-first aspect, alone or in combination with one or more of the first through twentieth aspects, the MB-QoS flow is associated with a first logical channel identifier and is configured as a non-switchable MB-QoS flow that cannot be switched between a multicast broadcast radio bearer and a dedicated radio bearer; and the process includes receiving an instruction to reconfigure the MB-QoS flow to a switchable MB-QoS flows that can be switched between a multicast broadcast radio bearer and a dedicated radio bearer, wherein the instruction includes a second logical channel identifier for the MB-QoS flow.

In a twenty-second aspect, alone or in combination with one or more of the first through twenty-first aspects, the process includes receiving (for example, using reception component 1302 of FIG. 13) the instruction in at least one of a multicast control channel communication or a radio resource control message.

In a twenty-third aspect, alone or in combination with one or more of the first through twenty-second aspects, the mode includes at least one of: a first mode in which each MB-QoS flow, of a first set of MB-QoS flows, is mapped to a different logical channel identifier and is mapped to a different G-RNTI, a second mode in which each MB-QoS flow, of a second set of MB-QoS flows, is mapped to a different logical channel identifier and is mapped to a common G-RNTI used for multiple MB-QoS flows, a third mode in which each MB-QoS flow, of a third set of MB-QoS flows, is mapped to a different G-RNTI and is mapped to a common logical channel identifier used for multiple MB-QoS flows, a fourth mode in which each MB-QoS flow, of a fourth set of MB-QoS flows, is mapped to a fixed logical channel identifier used for all MB-QoS flows and is mapped to a G-RNTI that identifies a service type of the MB-QoS flow, a fifth mode in which each MB-QoS flow, of a fifth set of MB-QoS flows, is mapped to a first logical channel identifier and a G-RNTI for multicast or broadcast transmissions and is mapped to a second logical channel identifier and a C-RNTI associated with the UE for unicast transmissions, or a combination thereof.

In a twenty-fourth aspect, alone or in combination with one or more of the first through twenty-third aspects, the logical channel identifiers correspond to multicast broadcast traffic channels, and the multicast broadcast traffic channels and a multicast broadcast control channel are carried in a physical downlink shared channel.

In a twenty-fifth aspect, alone or in combination with one or more of the first through twenty-fourth aspects, the process includes performing soft combining (for example, using soft combining component 1314 of FIG. 13) of a first MAC TB of the MB-QoS flow received in a multicast or broadcast transmission scrambled using a G-RNTI and a second MAC TB of the MB-QOS flow received in a unicast transmission scrambled using a cell RNTI.

In a twenty-sixth aspect, alone or in combination with one or more of the first through twenty-fifth aspects, the process includes performing the soft combining (for example, using soft combining component 1314 of FIG. 13) based at least in part on a determination that the first MAC TB and the second MAC TB carry the same content.

Figure 13:
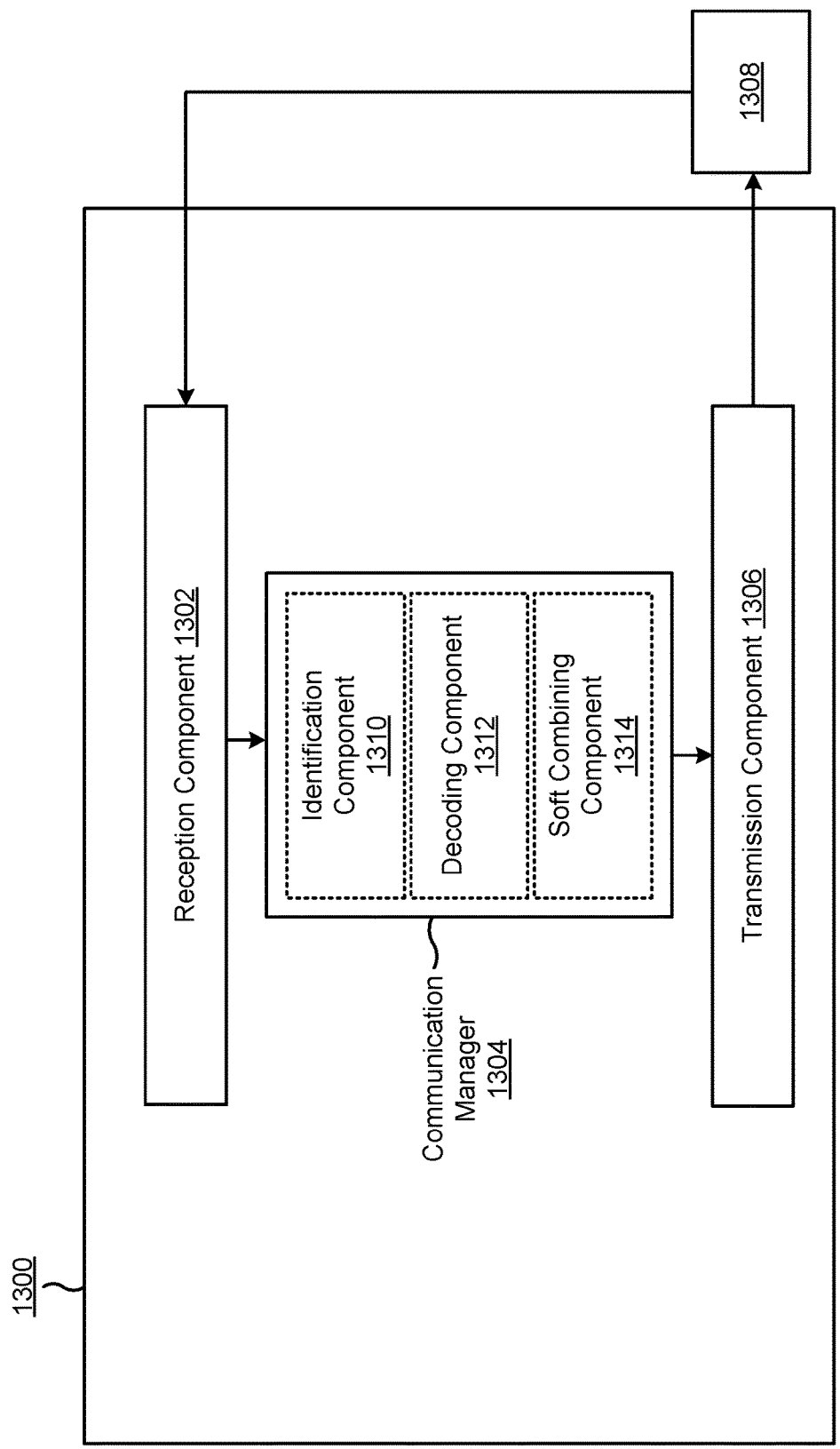
FIG. 13 is a block diagram of an example apparatus for wireless communication in accordance with various aspects of the present disclosure.

FIG. 13 is a block diagram of an example apparatus 1300 for wireless communication in accordance with various aspects of the present disclosure. The apparatus 1300 may be a UE, or a UE may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a UE, a base station, or another wireless communication device) using the reception component 1302 and the transmission component 1306.

In some aspects, the apparatus 1300 may be configured to perform one or more operations described herein in connection with FIGS. 6-11. Additionally or alternatively, the apparatus 1300 may be configured to perform one or more processes described herein, such as process 1200 of FIG. 12. In some aspects, the apparatus 1300 may include one or more components of the UE described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the UE described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the UE described above in connection with FIG. 2. In some aspects, the transmission component 1306 may be co-located with the reception component 1302 in a transceiver.

The communication manager 1304 may receive or may cause the reception component 1302 to receive an indication of a mode for mapping MB-QoS flows to logical channel identifiers and G-RNTIs. The communication manager 1304 may identify an MB-QoS flow from a MAC TB based at least in part on the indicated mode. The communication manager 1304 may decode data included in the MB-QoS flow.

In some aspects, the communication manager 1304 may include a controller/processor, a memory, or a combination thereof, of the UE described above in connection with FIG. 2.

In some aspects, the communication manager 1304 may include a set of components, such as an identification component 1310, a decoding component 1312, a soft combining component 1314, or a combination thereof. Alternatively, the set of components may be separate and distinct from the communication manager 1304. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1310 may receive an indication of a mode for mapping MB-QoS flows to logical channel identifiers and G-RNTIs. The identification component 1310 may identify an MB-QoS flow from a MAC TB based at least in part on the indicated mode. The decoding component 1312 may decode data included in the MB-QoS flow.

In some aspects, the identification component 1310 may identify the MB-QoS flow from a unicast transmission based at least in part on a C-RNTI for the UE and a unique logical channel identifier corresponding to the MB-QoS flow. In some aspects, the identification component 1310 may identify the MB-QoS flow from a multicast or broadcast transmission based at least in part on a logical channel identifier corresponding to the MB-QoS flow. In some aspects, the identification component 1310 may identify the MB-QoS flow from a unicast transmission based at least in part on a C-RNTI for the UE and a unique logical channel identifier corresponding to the MB-QoS flow. In some aspects, the identification component 1310 may identify the MB-QoS flow from a multicast or broadcast transmission based at least in part on a unique G-RNTI corresponding to the MB-QoS flow. In some aspects, the identification component 1310 may identify the MB-QoS flow from a unicast transmission based at least in part on a C-RNTI for the UE, the common logical channel identifier, and a unique G-RNTI corresponding to the MB-QoS flow. In some aspects, the identification component 1310 may identify the MB-QoS flow based at least in part on a logical channel identifier and at least one of a G-RNTI or a multicast broadcast radio bearer identifier indicated in a MAC PDU sub-header for the MB-QoS flow.

In some aspects, the reception component 1302 may receive the instruction in at least one of a multicast control channel communication or a radio resource control message. In some aspects, the soft combining component 1314 may perform soft combining of a first MAC TB of the MB-QoS flow received in a multicast or broadcast transmission scrambled using a G-RNTI and a second MAC TB of the MB-QOS flow received in a unicast transmission scrambled using a cell RNTI. In some aspects, the soft combining component 1314 may perform the soft combining based at least in part on a determination that the first MAC TB and the second MAC TB carry the same content.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples, or combinations thereof), and may be used interchangeably with "one or more." Where only one item is intended, the phrase "only one" or similar language is used. Also, as used herein, the terms "has," "have," "having," among other examples, are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving an indication of a mode that maps multicast broadcast quality of service (MB-QoS) flows to logical channel identifiers and group radio network temporary identifiers (G-RNTIs), wherein the indicated mode is one of:
a first mode in which each MB-QoS flow, of a first set of MB-QoS flows, is mapped to a different logical channel identifier and is mapped to a different G-RNTI,
a second mode in which each MB-QoS flow, of a second set of MB-QoS flows, is mapped to a different logical channel identifier and is mapped to a common G-RNTI used for multiple MB-QoS flows, or
a third mode in which each MB-QoS flow, of a third set of MB-QoS flows, is mapped to a different G-RNTI and is mapped to a common logical channel identifier used for multiple MB-QoS flows;
identifying an MB-QoS flow from a medium access control (MAC) transport block (TB) based at least in part on the indicated mode; and
decoding data included in the MB-QoS flow.

2. The method of claim 1, wherein:
the indicated mode is the first mode; and
the method further comprises identifying the MB-QoS flow from a multicast or broadcast transmission based at least in part on a unique G-RNTI corresponding to the MB-QoS flow.

3. The method of claim 2, wherein multiple MB-QoS flows are multiplexed in the multicast or broadcast transmission using one of:
a single MAC TB that is transmitted multiple times, wherein each MAC TB transmission is scrambled using a different G-RNTI, or
different MAC TBs corresponding to different logical channel identifiers, wherein each MAC TB is scrambled using a different G-RNTI.

4. The method of claim 1, wherein:
the indicated mode is the first mode; and
the method further comprises identifying the MB-QoS flow from a unicast transmission based at least in part on a cell RNTI (C-RNTI) and a unique logical channel identifier corresponding to the MB-QoS flow.

5. The method of claim 1, wherein:
the indicated mode is the second mode; and
the method further comprises identifying the MB-QoS flow from a multicast or broadcast transmission based at least in part on a logical channel identifier corresponding to the MB-QoS flow.

6. The method of claim 5, wherein multiple MB-QoS flows are multiplexed in the multicast or broadcast transmission using one of:
a single MAC TB scrambled using the common G-RNTI, or
different MAC TBs corresponding to different logical channel identifiers, wherein each MAC TB is scrambled using the common G-RNTI.

7. The method of claim 1, wherein:
the indicated mode is the second mode; and
the method further comprises identifying the MB-QoS flow from a unicast transmission based at least in part on a cell RNTI (C-RNTI) and a unique logical channel identifier corresponding to the MB-QoS flow.

8. The method of claim 1, wherein:
the indicated mode is the second mode; and
the second set of MB-QoS flows includes one or more switchable MB-QoS flows that can be switched between a multicast broadcast radio bearer, for a multicast or broadcast transmission, and a dedicated radio bearer for a unicast transmission.

9. The method of claim 1, wherein:
the indicated mode is the third mode; and
the method further comprises identifying the MB-QoS flow from a multicast or broadcast transmission based at least in part on a unique G-RNTI corresponding to the MB-QoS flow.

10. The method of claim 9, wherein multiple MB-QoS flows are multiplexed in the multicast or broadcast transmission using one of:
a single MAC TB that is transmitted multiple times, wherein each MAC TB transmission is scrambled using a different G-RNTI, or
different MAC TBs corresponding to the common logical channel identifier, wherein each MAC TB is scrambled using a different G-RNTI.

11. The method of claim 1, wherein:
the indicated mode is the third mode; and
the method further comprises identifying the MB-QoS flow from a unicast transmission based at least in part on a cell RNTI (C-RNTI), the common logical channel identifier, and a unique G-RNTI corresponding to the MB-QoS flow.

12. The method of claim 1, wherein:
the indicated mode is the third mode; and
the third set of MB-QoS flows includes one or more non-switchable MB-QoS flows that cannot be switched between a multicast broadcast radio bearer, for a multicast or broadcast transmission, and a dedicated radio bearer for a unicast transmission.

13. The method of claim 1, wherein:
the indicated mode is the third mode; and
the third set of MB-QoS flows includes one or more switchable MB-QoS flows that can be switched between a multicast broadcast radio bearer, for a multicast or broadcast transmission, and a dedicated radio bearer for a unicast transmission.

14. The method of claim 1, further comprising receiving an indication of a fourth mode in which each MB-QoS flow, of a fourth set of MB-QoS flows, is mapped to a fixed logical channel identifier used for all MB-QoS flows and is mapped to a multicast broadcast radio bearer identifier that identifies a service type of a respective MB-QoS flow of the fourth set.

15. The method of claim 1, further comprising identifying the MB-QoS flow based at least in part on a logical channel identifier and at least one of a G-RNTI or a multicast broadcast radio bearer identifier indicated in a MAC packet data unit (PDU) sub-header for the MB-QoS flow.

16. The method of claim 1, further comprising receiving an indication of a fourth mode in which each MB-QoS flow, of a fourth set of MB-QoS flows, is mapped to a first logical channel identifier and a G-RNTI for multicast or broadcast transmissions and is mapped to a second logical channel identifier and a cell RNTI (C-RNTI) associated with the UE for unicast transmissions,
wherein the first logical channel identifier and the G-RNTI for multicast or broadcast transmissions are configured using a multicast control channel, and the second logical channel identifier and the C-RNTI are configured in a radio resource control message.

17. The method of claim 1, further comprising receiving an indication of a fourth mode in which each MB-QoS flow, of a fourth set of MB-QoS flows, is mapped to a first logical channel identifier and a G-RNTI for multicast or broadcast transmissions and is mapped to a second logical channel identifier and a cell RNTI (C-RNTI) associated with the UE for unicast transmissions,
wherein the first logical channel identifier, the G-RNTI for multicast or broadcast transmissions, the second logical channel identifier, and the C-RNTI are configured in a radio resource control message.

18. The method of claim 1, wherein:
the MB-QoS flow is associated with a first logical channel identifier and is configured as a non-switchable MB-QoS flow that cannot be switched between a multicast broadcast radio bearer and a dedicated radio bearer; and
the method further comprises receiving an instruction to reconfigure the MB-QoS flow to a switchable MB-QoS flow that can be switched between the multicast broadcast radio bearer and the dedicated radio bearer, wherein the instruction includes a second logical channel identifier for the MB-QoS flow.

19. The method of claim 18, further comprising receiving the instruction in at least one of a multicast control channel communication or a radio resource control message.

20. The method of claim 1, wherein the logical channel identifiers correspond to multicast broadcast traffic channels, and wherein the multicast broadcast traffic channels and a multicast broadcast control channel are carried in a physical downlink shared channel.

21. The method of claim 1, further comprising performing soft combining of a first MAC TB of the MB-QoS flow received in a multicast or broadcast transmission scrambled using a G-RNTI and a second MAC TB of the MB-QoS flow received in a unicast transmission scrambled using a cell RNTI.

22. The method of claim 21, further comprising performing the soft combining based at least in part on a determination that the first MAC TB and the second MAC TB carry the same content.

23. A user equipment (UE) for wireless communication, comprising:
a memory; and
one or more processors coupled to the memory, the one or more processors configured to:
receive an indication of a mode that maps multicast broadcast quality of service (MB-QoS) flows to logical channel identifiers and group radio network temporary identifiers (G-RNTIs), wherein the indicated mode is one of:
a first mode in which each MB-QoS flow, of a first set of MB-QoS flows, is mapped to a different logical channel identifier and is mapped to a different G-RNTI,
a second mode in which each MB-QoS flow, of a second set of MB-QoS flows, is mapped to a different logical channel identifier and is mapped to a common G-RNTI used for multiple MB-QoS flows, or
a third mode in which each MB-QoS flow, of a third set of MB-QoS flows, is mapped to a different G-RNTI and is mapped to a common logical channel identifier used for multiple MB-QoS flows;
identify an MB-QoS flow from a medium access control (MAC) transport block (TB) based at least in part on the indicated mode; and
decode data included in the MB-QoS flow.

24. A non-transitory computer-readable medium storing one or more instructions for wireless communication, the one or more instructions comprising:
one or more instructions that, when executed by one or more processors of a user equipment (UE), cause the UE to:
receive an indication of a mode that maps multicast broadcast quality of service (MB-QoS) flows to logical channel identifiers and group radio network temporary identifiers (G-RNTIs), wherein the indicated mode is one of:
a first mode in which each MB-QoS flow, of a first set of MB-QoS flows, is mapped to a different logical channel identifier and is mapped to a different G-RNTI,
a second mode in which each MB-QoS flow, of a second set of MB-QoS flows, is mapped to a different logical channel identifier and is mapped to a common G-RNTI used for multiple MB-QoS flows, or
a third mode in which each MB-QoS flow, of a third set of MB-QoS flows, is mapped to a different G-RNTI and is mapped to a common logical channel identifier used for multiple MB-QoS flows;
identify an MB-QoS flow from a medium access control (MAC) transport block (TB) based at least in part on the indicated mode; and
decode data included in the MB-QoS flow.

25. An apparatus for wireless communication, comprising:
means for receiving an indication of a mode that maps multicast broadcast quality of service (MB-QoS) flows to logical channel identifiers and group radio network temporary identifiers (G-RNTIs), wherein the indicated mode is one of:
a first mode in which each MB-QoS flow, of a first set of MB-QoS flows, is mapped to a different logical channel identifier and is mapped to a different G-RNTI,
a second mode in which each MB-QoS flow, of a second set of MB-QoS flows, is mapped to a different logical channel identifier and is mapped to a common G-RNTI used for multiple MB-QoS flows, or
a third mode in which each MB-QoS flow, of a third set of MB-QoS flows, is mapped to a different G-RNTI and is mapped to a common logical channel identifier used for multiple MB-QoS flows;
means for identifying an MB-QoS flow from a medium access control (MAC) transport block (TB) based at least in part on the indicated mode; and
means for decoding data included in the MB-QoS flow.

26. The UE of claim 23, wherein:
the indicated mode is the first mode; and
the one or more processors are further configured to identify the MB-QoS flow from a multicast or broadcast transmission based at least in part on a unique G-RNTI corresponding to the MB-QoS flow.

27. The UE of claim 26, wherein multiple MB-QoS flows are multiplexed in the multicast or broadcast transmission using one of:
   a single MAC TB that is transmitted multiple times, wherein each MAC TB transmission is scrambled using a different G-RNTI, or
   different MAC TBs corresponding to different logical channel identifiers, wherein each MAC TB is scrambled using a different G-RNTI.

28. The UE of claim 23, wherein:
   the indicated mode is the second mode; and
   the one or more processors are further configured to identify the MB-QoS flow from a multicast or broadcast transmission based at least in part on a logical channel identifier corresponding to the MB-QoS flow.

29. The UE of claim 28, wherein multiple MB-QoS flows are multiplexed in the multicast or broadcast transmission using one of:
   a single MAC TB scrambled using the common G-RNTI, or
   different MAC TBs corresponding to different logical channel identifiers, wherein each MAC TB is scrambled using the common G-RNTI.

30. The UE of claim 23, wherein:
   the indicated mode is the second mode; and
   the one or more processors are further configured to identify the MB-QoS flow from a unicast transmission based at least in part on a cell RNTI (C-RNTI) and a unique logical channel identifier corresponding to the MB-QoS flow.

* * * * *